(12) United States Patent
Meyer et al.

(10) Patent No.: US 10,026,098 B2
(45) Date of Patent: *Jul. 17, 2018

(54) SYSTEMS AND METHODS FOR CONFIGURING AND PRESENTING NOTICES TO VIEWERS OF ELECTRONIC AD CONTENT REGARDING TARGETED ADVERTISING TECHNIQUES USED BY INTERNET ADVERTISING ENTITIES

(71) Applicant: Evidon, Inc., New York, NY (US)

(72) Inventors: Scott B. Meyer, Mount Kisco, NY (US); Felix Shnir, Brooklyn, NY (US); Simeon Simeonov, Lincoln, MA (US); Edward Kozek, New York, NY (US); Colin O'Malley, San Francisco, CA (US); Daniel Jaye, Celebration, FL (US)

(73) Assignee: Evidon, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,678

(22) Filed: May 27, 2016

(65) Prior Publication Data

US 2017/0116642 A1    Apr. 27, 2017

Related U.S. Application Data

(63) Continuation of application No. 12/971,588, filed on Dec. 17, 2010, now Pat. No. 9,361,631.

(60) Provisional application No. 61/292,642, filed on Jan. 6, 2010.

(51) Int. Cl.
 G06Q 30/00      (2012.01)
 G06Q 30/02      (2012.01)
 H04L 29/08      (2006.01)

(52) U.S. Cl.
 CPC ..... *G06Q 30/0256* (2013.01); *G06Q 30/0277* (2013.01); *H04L 67/02* (2013.01)

(58) Field of Classification Search
 CPC ....................................................... G06Q 30/02
 USPC ....................... 705/14.4, 14.49, 14.54, 14.73
 See application file for complete search history.

(56) References Cited

U.S. PATENT DOCUMENTS

| | | | |
|---|---|---|---|
| 5,870,559 | A | 2/1999 | Leshem |
| 6,144,962 | A | 11/2000 | Weinberg et al. |
| 6,993,586 | B2 | 1/2006 | Chen et al. |
| 7,756,744 | B2 | 7/2010 | Schiff et al. |

(Continued)

FOREIGN PATENT DOCUMENTS

| | | |
|---|---|---|
| EP | 2659367 B1 | 2/2017 |
| WO | WO-2006033108 A2 | 3/2006 |

(Continued)

OTHER PUBLICATIONS

Extended European Search Report dated Feb. 2, 2017 from European Patent Application No. 14771984.3-1871, 7 pp.

(Continued)

*Primary Examiner* — Sun M Li
(74) *Attorney, Agent, or Firm* — Cooley LLP

(57) ABSTRACT

A computerized system and techniques facilitate the monitoring and management of online behaviorally-targeted advertising. In certain embodiments, electronic notifications related to advertising practices of members of an online advertising ecosystem are presented to users based on the discovery of elements of online content aimed at delivering targeted advertising messages to viewers of the content.

39 Claims, 10 Drawing Sheets

(56) References Cited

U.S. PATENT DOCUMENTS

| | | |
|---|---|---|
| 7,895,078 B2 | 2/2011 | Schiff et al. |
| 8,132,095 B2 | 3/2012 | Seolas et al. |
| 8,261,362 B2 | 9/2012 | Goodwin et al. |
| 8,365,062 B2 | 1/2013 | Seolas et al. |
| 8,448,241 B1 | 5/2013 | Kadakia |
| 8,516,590 B1 | 8/2013 | Ranadive et al. |
| 8,516,601 B2 | 8/2013 | Goodwin et al. |
| 8,578,019 B2 | 11/2013 | Seolas et al. |
| 8,589,790 B2 | 11/2013 | Seolas et al. |
| 8,640,037 B2 | 1/2014 | Goodwin et al. |
| 8,805,946 B1 | 8/2014 | Glommen |
| 8,843,827 B2 | 9/2014 | Koo et al. |
| 8,898,808 B1 | 11/2014 | Kittrell et al. |
| 8,904,278 B1 | 12/2014 | Anderson et al. |
| 8,990,298 B1 | 3/2015 | Anderson |
| 8,996,986 B2 | 3/2015 | Manion et al. |
| 8,997,081 B1 | 3/2015 | Manion et al. |
| 9,003,552 B2 | 4/2015 | Goodwin et al. |
| 9,081,789 B2 | 7/2015 | Anderson |
| 9,116,608 B2 | 8/2015 | Koo et al. |
| 9,203,720 B2 | 12/2015 | Seolas et al. |
| 9,219,787 B1 | 12/2015 | Manion et al. |
| 9,268,547 B2 | 2/2016 | Manion et al. |
| 9,288,256 B2 | 3/2016 | Goodwin |
| 9,313,287 B2 | 4/2016 | Glommen et al. |
| 9,357,023 B2 | 5/2016 | Glommen et al. |
| 9,357,366 B2 | 5/2016 | Seolas et al. |
| 9,361,631 B2 | 6/2016 | Meyer et al. |
| 9,363,311 B1 | 6/2016 | McWilliams et al. |
| 9,412,115 B2 | 8/2016 | Seolas et al. |
| 9,418,170 B2 | 8/2016 | Seolas et al. |
| 9,424,593 B2 | 8/2016 | Schiff et al. |
| 9,436,580 B2 | 9/2016 | Manion et al. |
| 9,479,609 B2 | 10/2016 | Anderson |
| 9,537,964 B2 | 1/2017 | Glommen et al. |
| 9,553,918 B1 | 1/2017 | Manion et al. |
| 2004/0176104 A1 | 9/2004 | Arcens |
| 2004/0185875 A1 | 9/2004 | Diacakis et al. |
| 2005/0262104 A1 | 11/2005 | Robertson et al. |
| 2006/0101155 A1 | 5/2006 | Damour et al. |
| 2006/0223518 A1 | 10/2006 | Haney |
| 2007/0178908 A1 | 8/2007 | Doyle |
| 2007/0217557 A1 | 9/2007 | Schiff et al. |
| 2008/0172274 A1 | 7/2008 | Hurowitz et al. |
| 2009/0287713 A1 | 11/2009 | Anderson et al. |
| 2010/0030792 A1 | 2/2010 | Swinton et al. |
| 2010/0161411 A1 | 6/2010 | Wu et al. |
| 2010/0299205 A1 | 11/2010 | Erdmann et al. |
| 2010/0312647 A1 | 12/2010 | Schiff et al. |
| 2011/0196743 A1 | 8/2011 | Schiff et al. |
| 2012/0030559 A1 | 2/2012 | Manion et al. |
| 2012/0072488 A1 | 3/2012 | Manion et al. |
| 2012/0144282 A1 | 6/2012 | Loeb et al. |
| 2012/0174236 A1 | 7/2012 | Goodwin et al. |
| 2012/0210377 A1 | 8/2012 | Wong et al. |
| 2012/0246310 A1 | 9/2012 | Broda et al. |
| 2012/0284801 A1 | 11/2012 | Goodwin et al. |
| 2013/0311496 A1 | 12/2012 | Cao et al. |
| 2013/0160120 A1 | 6/2013 | Malaviya et al. |
| 2013/0191647 A1 | 7/2013 | Ferrara et al. |
| 2013/0212638 A1 | 8/2013 | Wilson |
| 2013/0227078 A1 | 8/2013 | Wei et al. |
| 2013/0263023 A1 | 10/2013 | Goodwin et al. |
| 2013/0276136 A1 | 10/2013 | Goodwin et al. |
| 2013/0290480 A1 | 10/2013 | Manion et al. |
| 2013/0326476 A1 | 12/2013 | Wyatt et al. |
| 2013/0331067 A1 | 12/2013 | Coussemaeker et al. |
| 2014/0041048 A1 | 2/2014 | Goodwin et al. |
| 2014/0052851 A1 | 2/2014 | Nielsen |
| 2014/0082482 A1 | 3/2014 | Seolas et al. |
| 2014/0137006 A1 | 5/2014 | Goodwin et al. |
| 2014/0208216 A1 | 7/2014 | Koo et al. |
| 2015/0058121 A1 | 2/2015 | Navin |
| 2015/0066587 A1 | 3/2015 | Glommen et al. |
| 2015/0120858 A1 | 4/2015 | Anderson |
| 2015/0127720 A1 | 5/2015 | Glommen et al. |
| 2015/0143244 A1 | 5/2015 | Koo et al. |
| 2015/0154637 A1 | 6/2015 | Schiff et al. |
| 2015/0169784 A1 | 6/2015 | Anderson |
| 2015/0207869 A1 | 7/2015 | Manion et al. |
| 2015/0212992 A1 | 7/2015 | Anderson et al. |
| 2015/0213282 A1 | 7/2015 | Goodwin et al. |
| 2015/0295988 A1 | 10/2015 | Goodwin |
| 2016/0044128 A1 | 2/2016 | Anderson |
| 2016/0072905 A1 | 3/2016 | Glommen et al. |
| 2016/0078078 A1 | 3/2016 | Seolas et al. |
| 2016/0085658 A1 | 3/2016 | Manion et al. |
| 2016/0164954 A1 | 6/2016 | McWilliams et al. |
| 2016/0173651 A1 | 6/2016 | Manion et al. |
| 2016/0180375 A1 | 6/2016 | Rose et al. |
| 2016/0198015 A1 | 7/2016 | Goodwin |
| 2016/0269497 A1 | 9/2016 | Glommen et al. |
| 2016/0314502 A1 | 10/2016 | Lindsay et al. |
| 2016/0314503 A1 | 10/2016 | Lindsay et al. |
| 2016/0337367 A1 | 11/2016 | Goodwin et al. |
| 2016/0344684 A1 | 11/2016 | Strycker et al. |
| 2016/0381122 A1 | 12/2016 | Glommen et al. |
| 2017/0006086 A1 | 1/2017 | McWilliams et al. |
| 2017/0041426 A1 | 2/2017 | Anderson |

FOREIGN PATENT DOCUMENTS

| | | |
|---|---|---|
| WO | WO-2006033108 A3 | 12/2006 |
| WO | WO-2011084843 A1 | 7/2011 |
| WO | WO-2012092487 A1 | 7/2012 |
| WO | WO-2013126084 A2 | 8/2013 |
| WO | WO-2013126084 A3 | 8/2013 |
| WO | WO-2014116542 A1 | 7/2014 |
| WO | WO-2014144498 A2 | 9/2014 |
| WO | WO-2014144498 A3 | 9/2014 |
| WO | WO-2014151539 A1 | 9/2014 |
| WO | WO-2015031400 A1 | 3/2015 |
| WO | WO-2015031402 A1 | 3/2015 |
| WO | WO-2015069659 A1 | 5/2015 |
| WO | WO-2015157646 A1 | 10/2015 |
| WO | WO 2016/028771 | 2/2016 |
| WO | WO-2016044534 A1 | 3/2016 |
| WO | WO-2016064431 A1 | 4/2016 |

OTHER PUBLICATIONS

Supplementary European Search Report dated Feb. 22, 2017 from European Patent Application No. 14771984.3-871, 2 pp.
Office Action dated Feb. 21, 2017 from U.S. Appl. No. 14/465,389.
International Search Report and Written Opinion dated Jul. 6, 2016 from Application No. PCT/US2016/026994.
International Search Report and Written Opinion dated Jul. 7, 2016 from Application No. PCT/US2016/020531.
Office Action dated Jun. 17, 2016 from U.S. Appl. No. 13/968,098.
U.S. Appl. No. 15/096,220, filed Apr. 11, 2016, Ruback.
U.S. Appl. No. 15/059,296, filed Mar. 2, 2016, Nielsen.
International Search Report and Written Opinion dated Apr. 14, 2015 from Application No. PCT/US2014/052117.
Notice of Allowance dated Apr. 25, 2016 from U.S. Appl. No. 12/971,577.
Notice of Allowance dated Sep. 10, 2014 from U.S. Appl. No. 14/152,480.
Office Action dated Mar. 26, 2014 from U.S. Appl. No. 14/152,480.
Office Action dated May 15, 2015 from U.S. Appl. No. 12/971,588.
Office Action dated May 29, 2012 from U.S. Appl. No. 12/971,588.
Office Action dated Oct. 6, 2015 from U.S. Appl. No. 12/971,588.
Office Action dated Oct. 8, 2015 from U.S. Appl. No. 13/968,098.
Office Action dated Dec. 21, 2012 from U.S. Appl. No. 12/971,588.
Nielsen, co-pending U.S. Publication No. 2014-0052851, published Feb. 20, 2014.
Navin, co-pending U.S. Publication No. 2015-0058121, published Feb. 26, 2015.

FIG. 7

SYSTEMS AND METHODS FOR CONFIGURING AND PRESENTING NOTICES TO VIEWERS OF ELECTRONIC AD CONTENT REGARDING TARGETED ADVERTISING TECHNIQUES USED BY INTERNET ADVERTISING ENTITIES

CROSS-REFERENCE TO RELATED APPLICATIONS

This application claims the benefit, under 35 U.S.C. § 120, as a continuation (CON) of U.S. non-provisional application Ser. No. 12/971,588, filed on Dec. 17, 2010 entitled "Managing and Monitoring Digital Advertising."

U.S. non-provisional application Ser. No. 12/971,588, filed on Dec. 17, 2010, claims priority to and the benefit of U.S. provisional patent application Ser. No. 61/292,642, filed Jan. 6, 2010 entitled "Managing and Monitoring Digital Advertising."

TECHNICAL FIELD

This invention relates to methods and systems for managing and monitoring digital advertising, and, more particularly, for tracking how advertisers, ad networks, ad delivery systems, content publishers and/or other members of an advertising ecosystem deliver advertising content to users.

BACKGROUND

Digital advertising is an important source of revenue for online content providers, mobile carriers as well as Internet portals such as Google, Yahoo!, MSN, and AOL. A number of online advertisement formats are currently in use, along with various associated distribution requirements, advertising metrics, and pricing mechanisms. In many cases, conventional Hypertext Markup Language (HTML) and Hypertext Transfer Protocol (HTTP) techniques enable the inclusion of an advertisement within a page such that an advertisement, and often a different ad, can be selected for display each time the page is requested.

One of the ongoing challenges for advertisers across all media is to deliver the right message to the right person at the right time—i.e., effectively "targeting" advertisements to the audience. As a simple example, television commercials aired during sporting events tend to advertise beer, cars, and other products typically associated with young males. Likewise, online and digital (e.g., web-based, mobile, etc.) advertisers, content providers and ad networks look for ways to target advertisements to particular users. For example, an advertisement may be selected based on the content of the page into which it is being inserted and served, such as ads targeted to males ages 18-35 on a football-related website. Another way online advertisers provide targeted advertisements is through behavior tracking. For example, a user who frequently views financial websites and data may be targeted to receive advertisements related to online trading and banking services. In many cases, information collected through behavior tracking can be further processed and in some cases augmented with additional data sources to enable other types of targeting of advertisements, such as demographic targeting and/or collaborative filtering.

In some cases, the targeting may be subtle in that the ads do not appear as typical ads, but instead are manifested as content personalization or product recommendations.

In order to be most effective, behavioral tracking should be accurate, timely, thorough, and accessible across different domains, carriers and/or websites. For example, actions taken by a consumer at one website, within a particular domain or while using a certain service provider are most valuable when combined with actions from other domains. Furthermore, profiles generated by one domain or carrier should be accessible by another domain. In order to build and share such profiles, many websites track user behavior and interactions through the use of small data files that are deposited on the consumer's client (commonly referred to as "cookies") to identify repeat visitors. Often, advertisers and content providers interject scripts and/or page elements into websites in order to facilitate tracking user's actions. However, the collection and use (including, in some cases, sharing) of such behavioral data may implicate security and/or privacy related issues. In some instances, such issues may be legal or administrative in nature, whereas in other cases they may relate to personal preferences.

In response, in the narrow domain of Web-based advertising, the online advertising industry, Federal Trade Commission, and many consumer protection groups have put forth numerous suggestions and guidelines for governing the collection and use of such data. Recently, the FTC issued a Staff Report detailing certain "self-regulatory principles" for online behavior-targeted advertising. Whether these principles are adopted or not, the need to manage and monitor how websites, applications, advertising networks, broadcast networks, mobile services, content providers and other advertising ecosystem participants identify, track and target consumers will expand significantly.

As such, there is a need for an independent platform that monitors and reports on compliance to targeted advertising guidelines and practices.

SUMMARY OF THE INVENTION

Embodiments of the present invention are directed toward methods and supporting systems for programmatically tracking user's actions on websites and within domains, and for allowing users to view and manage how these actions are captured and used for targeted advertising. Further, compliance with targeted advertising guidelines and practices for users, content providers, advertising networks and other online service providers is monitored. For example, certain notice and disclosure elements (e.g., a privacy policy, opt-out or opt-in choices) may be present, and users may want to be directed to them in certain situations. However, discovering and identifying these elements can be difficult, depending on how certain web pages, mobile sites, and applications are constructed, and how the advertisements are placed and presented within them. Described in greater detail below are various examples of discovery engines and notice and disclosure techniques that may be used by parties serving ads and/or collecting data, by publishers, or by third party monitoring service acting on behalf of consumers.

Therefore, in one aspect of the invention, a computerized system for providing electronic notifications related to advertising practices of one or more members of an online advertising ecosystem includes a collection of discovery engines and computer-executable scripts. Each discovery engine is stored on a central service server and configured to execute against an element of electronic content and identify elements of the content aimed at delivering targeted advertising messages to viewers of the content. The computer-executable scripts which may also be stored on the central service server and transmitted to a client device. In some cases, the scripts may be provided to members of an online advertising ecosystem such that the scripts may be embedded directly into the online content. When executed, the scripts cause, in response to the discovery of targeted advertising messages in the electronic content by the discovery engines, the presentation of a notification indicating the use of targeted advertising methods by members of the online advertising ecosystem. The system also includes a placement engine for facilitating the presentation of the notification to users according to various presentation characteristics.

In some implementations, the placement engine includes a configuration subsystem for facilitating the selection of the notification to be presented to the viewers of the content, and a delivery subsystem for facilitating designation of visual and placement parameters of the notification. The notification may appear as an icon, image, text or some combination of any of the three. In some cases, the icon may be audible rather than visual. The notification may, in some cases, include a primary notice and a secondary notice. In such cases, the secondary notice is presented upon selection by a user of the primary notice and provides information describing behavioral targeted advertising practices of various members of an online advertising ecosystem, some of whom were responsible for selecting and providing the targeted advertising messages.

The system may also include a data storage module for storing indications of users' interactions with the notification, advertising practices of the one or more members of an online advertising ecosystem, and advertising preferences of the users. For example, the indications of users' interactions with the notification may include a user selecting a primary notification, a user viewing a secondary notification, a user selecting a secondary notification, a user changing preferences related to online advertising, and/or a user viewing advertising practices of a member of the advertising ecosystem. The advertising preferences of the users may include opting out of receiving behaviorally targeted advertisements from members of the advertising ecosystem, agreeing to receive behaviorally targeted advertisements from members of the advertising ecosystem, and specification of personal demographic information of the users which may be used to select and present targeted advertisements. A reporting engine may be provided to allow users, advertisers, and other members of the advertising ecosystem to query and view such data, in some cases via a web portal pursuant to a subscription agreement or other membership arrangement.

The online content may comprise web pages, video ads, audio ads, content delivered to mobile devices, email, text messages, etc. In some cases, the online content is structured as nested IFRAMES and the scripts operate within the IFRAMES to identify a top-level domain of the online content, thereby being able to identify all (or the relevant) members of the advertising ecosystem responsible for delivery of the advertisement and/or content.

In another aspect, a computer-implemented method for monitoring and managing behaviorally targeted advertising practices in an online environment includes storing, at a centralized monitoring service, discovery engines and computer-executable scripts. The discovery engines are to execute against an element of electronic content and identify elements of the content aimed at delivering targeted advertising messages to viewers of the content. The scripts are configured to be transmitted to a client device. The engines are executed against the content to determine the presence of behaviorally-targeted advertisements within the content, and the scripts, when executed cause the presentation of a notification indicating the use of behaviorally-targeted advertising methods by entities responsible for the delivery of the content.

In some implementations, the notification appears as an icon and the icon is presented in proximity to a behaviorally-targeted advertisement. The icon may be an image, text, video or any combination, and may, in some cases, include audio. The icon may act as an executable link, that, when selected, causes the presentation of a secondary notice, which presents information describing behavioral targeted advertising practices of members of an online advertising ecosystem that provided the targeted advertising messages.

Advertising preference data may be stored in a data storage device (e.g., a database). The data may include, for example, indications of users' interactions with the notification, advertising practices of the members of an online advertising ecosystem responsible for delivering the behaviorally-targeted advertisements, and/or preferences of the users with respect to being presented with behaviorally-targeted advertisements. Indications of users' interactions with the notification may include a user selecting a primary notification, a user viewing a secondary notification, a user selecting a secondary notification, a user changing preferences related to online advertising, and/or a user viewing advertising practices of a member of the advertising ecosystem. The preferences of the users may include opting out of receiving behaviorally targeted advertisements from certain (or all) members of the advertising ecosystem, agreeing to receive behaviorally targeted advertisements some of the members of the advertising ecosystem, and specification of personal demographic information of the users. Electronic access to some or all of the stored data may be provided via an online web service, for example.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

FIG. 7 is a screen capture showing additional detail information about a particular advertising entity in accordance with various embodiments of the invention.

DESCRIPTION OF THE INVENTION

Figure 1:
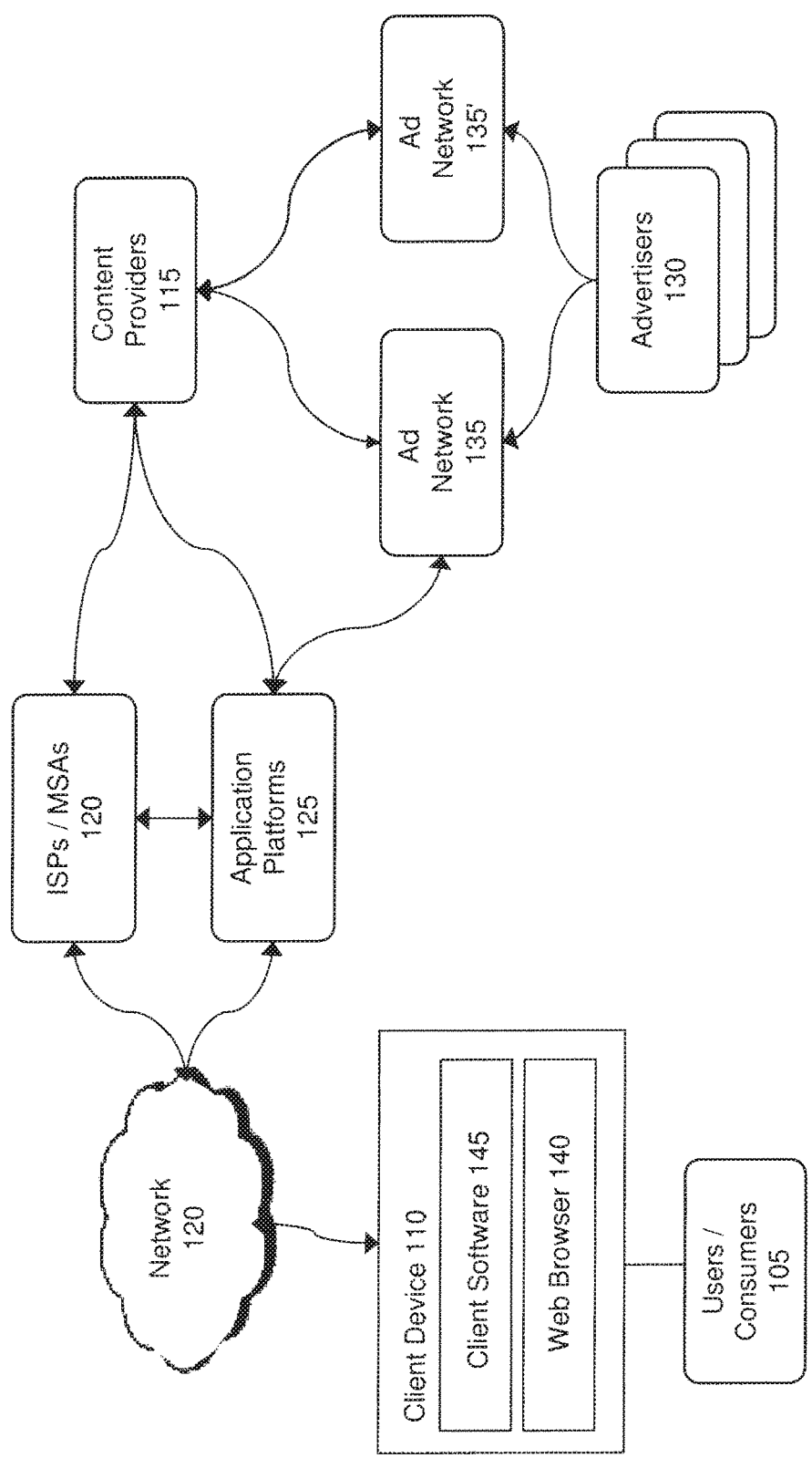
FIG. 1 illustrates one possible arrangement of constituents within a online advertising and content delivery ecosystem.

Referring to FIG. 1, various entities comprise an online content delivery environment in which environment in which users and consumers 105 (referred to herein as "users") operate various client devices 110 in order to view, download and generally interact with electronic content provided by content providers 115. The client devices 110 may be any electronic device configured to send, receive and/or display messages and content using an electronic network 120, such as a desktop computer, laptop, notebook, tablet computer, smartphone, personal data assistant or navigation system. For example, in instances in which the client device 110 is a smartphone, the device may be an iPhone or Android-based phone, the network may be a cellular telephone network or a wireless network. In cases in which the device is a desktop computer, the network 120 may be a wired Ethernet network connected to the Internet.

Content providers 115 manage, maintain, develop aggregate and/or collect content that will eventually be delivered to the users 105. Generally, the content is "pulled" to the user's device—that is it is delivered in response to a request from a user 105 by, for example, providing a result list in response to a search query or clicking on a HTTP hyperlink on a webpage. In other instances, the content may be "pushed" to the user by the content provider 115 based on an event (e.g., a news item matching predefined parameters) or a general email distribution. In either case, the content provider 115 typically sets aside some portion of the content as advertising space in order to "monetize" her content. Examples of ads typically seen in conjunction with content delivery include banner ads (adds at the top of or bottom of a page), "in content" ads (e.g., ads along side of or embedded within the content), linked ads (ads that appear when a user places a mouse or other pointer over a word, phrase or image) and pop-up ads.

The ads are generally created by advertisers 130, who provide the ads to ad networks 135 and 135' (generally, 135). The ad networks 135 act as "middle-men" between the advertisers 130 and the content providers 115. Such an arrangement allows advertisers 130 to create the ad and not be burdened with finding ad space in which the ad will run, and allows content providers 125 to allocate space within their content for ads without having to contract with multiple advertisers in order to fill the space. As used herein, "ad networks" 135 may refer to any online advertising-related technology system, including those used by ad networks to design and deliver their services, ad servers, demand- and supply-side advertising platforms, data management platforms, ad exchanges, and ad verification companies, all of whom may have distinct privacy and usage policies that may be of interest to the users receiving ads. While FIG. 1 is illustrated using one content provider 125, two ad networks 135 and three advertisers 130, it should be recognized that there may be any number of each entity, and in most implementations there may be thousands of content providers and advertisers and dozens of ad networks.

The users 105 typically operate the client devices 110 by interacting with software on the device 110, such as a web browser 140 that provides navigational and display functionality for content delivered to the device 110. Examples of commercially available web browser software 140 include INTERNET EXPLORER, offered by Microsoft Corporation, CHROME, offered by Google, SAFARI by Apple, Inc. and FIREFOX offered by the Mozilla Foundation. In some embodiments, the client device 110 also includes client software 145. The client software 145 provides functionality to the client 110 that allows a user to view, customize and observe the collection and use of advertising information by entities that deliver content and/or ads to their device as described in greater detail below. The client software 145 may be implemented in various forms, for example, it may be in the form of a Java or NET applet that is downloaded to the device 110 and runs in conjunction with the web browser 140, or the client software 145 may be in the form of a standalone application, implemented in a multi-platform language such as Java or in native processor executable code.

The communications network 120 connects the client device 135 with the other entities in the environment. Communication among the entities may take place via any media such as standard telephone lines, a local or wide-area network (LAN or WAN links such as T1, T3, 56 kb, X.25), broadband connections (ISDN, Frame Relay, ATM), wireless links (cellular, 802.11, Bluetooth, etc.), and so on. Preferably, the network 120 facilitates the transmission of TCP/IP protocol communications and HTTP/HTTPS requests made by the web browser 140. The type of network is not a limitation, however, and any suitable network may be used. Non-limiting examples of networks that can serve as or be part of the communications network 120 include a wireless or wired Ethernet-based intranet, LAN or WAN, and/or the global communications network known as the Internet, which may accommodate many different communications media and protocols.

In many implementations, a service provider 120 provides the client device 135 with access to the network 120. Examples of service providers may include Internet Service Providers ("ISPs"), cellular service providers, cable television subscription service providers and similar multiple system operators ("MSO's"). Furthermore, application platforms 125 (e.g., iGoogle, Facebook, Yahoo!, MSN, etc.) provide users with functions such as email, file sharing, chat, and other social networking features aimed at "capturing" the users so that a majority of their activity occurs through or is facilitated by the platform 125. By maintaining contact with the users over time and across multiple functions (communications, shopping, search, web browsing, etc.) the platforms 125 have access to a significant amount of information about the user's habits, likes and dislikes and can use this information to provide better services and more targeted advertising. In some instances, the application platforms, ISPs, content providers, ad networks and advertisers collect information regarding the user's web habits and share the information with each other as well as third parties. It is this collection and sharing of data based on the behavior of users (often without their knowledge or consent) that is addressed by the various aspects and embodiments of the present invention.

Figure 2:
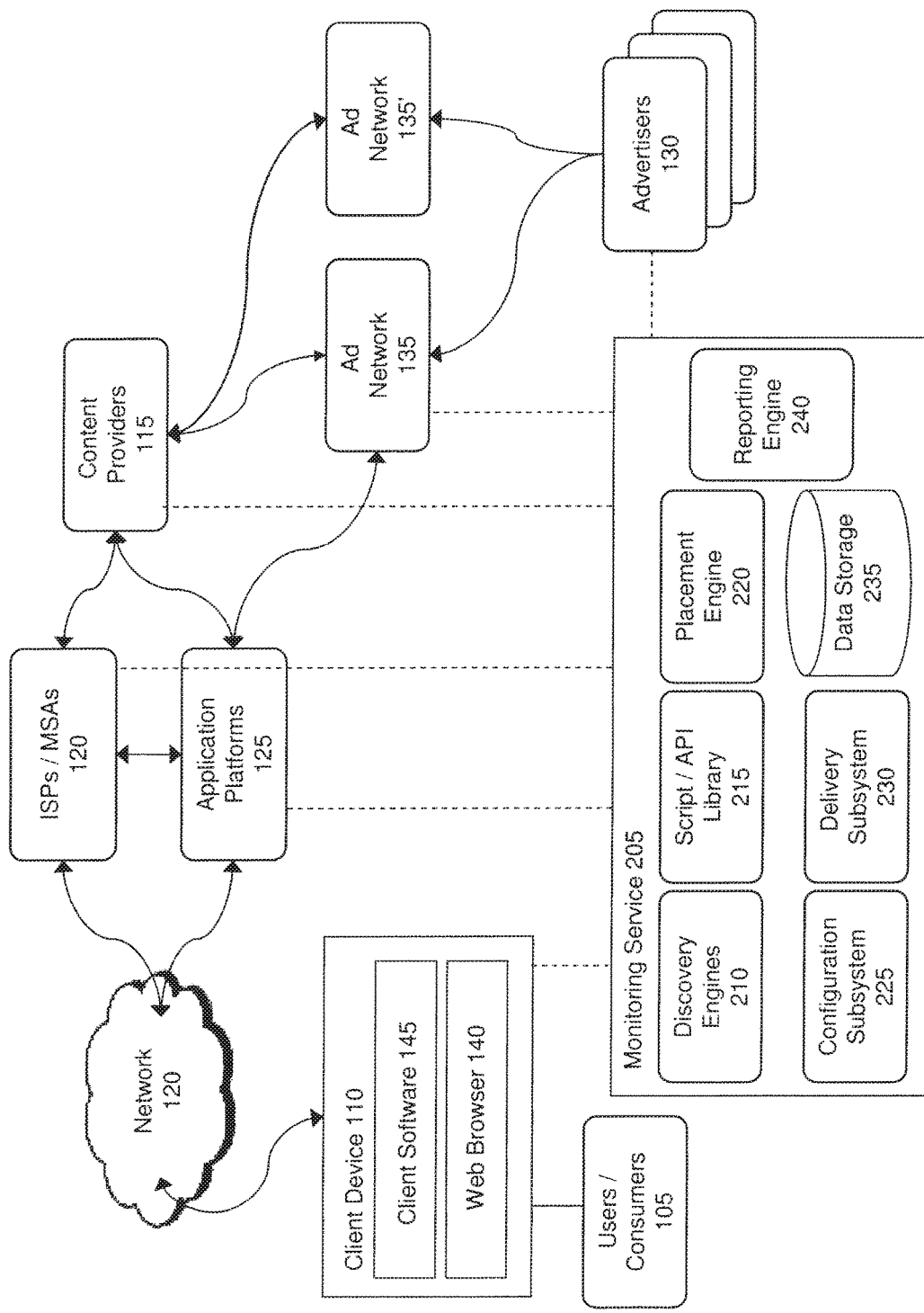
FIG. 2 illustrates the ecosystem of FIG. 1 augmented with an online advertising monitoring and reporting system according to various embodiments of the invention.

Referring now to FIG. 2, a monitoring service 205 includes software components and a data collection, analysis and reporting infrastructure that facilitates the monitoring of behavioral advertising activities of various entities within the online ecosystem. Further, the service provides users with the ability to view the targeted advertising and privacy policies of those entities within the online ecosystem that utilize or permit targeted advertising on their sites. Generally, and in various implementations, the service provides customized notices to users related to the targeted advertising techniques used to deliver content and/or advertising to the user as they request, review and interact with electronic content. The ads may be delivered via the Internet to one or more web pages, via a mobile carrier to a mobile device, or part of an application or widget included in other digital content such as games, social network applets, and the like. The notices may include information about the parties that collect and/or use behavioral information to serve ads to that user or users in general.

Generally, the service 205 includes multiple functional components, some of which can be provided to one or more of the entities operating within the online environment and operate remotely, whereas some components may operate as a centrally-managed service. For example, one or more discovery engines 210 operate on web pages, messages, emails, and other machine-readable code to identify elements, tags, text and other objects that may constitute signs that behavioral and/or targeted advertising is being used to deliver ads or other content to the user. In addition to the discovery engines, one or more scripts and/or APIs may be stored in a script library 215. The scripts and APIs may be made available to the various entities for inclusion into content or ads, as plug-ins into operational applications such as browsers, ad network servers and/or web servers such that as content is selected, delivered and/or rendered the scripts execute on the content to discover and report on advertising practices of the various entities. Users may interact with the service through the to manage their preferences and interests with respect to various third party content providers and/or publishers. In some cases, configuration settings and data supporting the discovery engines, scripts and APIs may also reside remote from the central service, thereby allowing users and other ecosystem participants to manage and store their settings and preferences locally.

A placement engine 220 provides the primary functions related to the reporting and monitoring of advertising practiced on the web. One component of the placement engine 220 includes a notice configuration and generation subsystem 225 that gives advertisers the capability to customize what notices are presented to users when they inquire about the source behind an advertisement and what the notices look like. In some embodiments, the configuration and generation subsystem 225 provides visual templates (e.g., CSS style sheets, HTML templates, etc.) for designing pop-up notices and other messages. The notices may include text, graphics and links to other sites or pages with additional information or forms related to privacy and advertising practices of the advertisers. Another component of the placement engine is a delivery subsystem 230 that allows advertisers (and in some cases the users) to define how and when the notices are delivered.

In certain implementations, the discovery engines 210 and/or the scripts 215 collect and report data and events back to a centralized database 235. The centralized database may include data related to the privacy and behavioral targeting policies and practices of the various members of the online environment. The database may also include historical data regarding how users request and interact with the various notices provided by the system, as well as user-specific information, if provided. For example, a user may provide general demographic information such as age, sex, income level and state or city of residence and, as she interacts with advertisement notices, the system may track which ads she requests notification for, whether she requests additional information, changes her preferences, opts out of any notices, etc. When gathered centrally across thousands of users and millions of interactions, the system can provide significant value to advertisers, ad networks and other members of the advertising ecosystem with regard to users' tolerances and preferences with regard to behavioral targeted advertising. A reporting engine 240 may be used to aggregate, summarize, analyze, anonymize, and format the data and facilitate the sharing of information among and with the various entities. In some cases, a service provider may operate the monitoring service and offer subscriptions (either free or fee-based) to the data. The functionality, usage and deployment options of each component are described in greater detail below.

Figure 3:
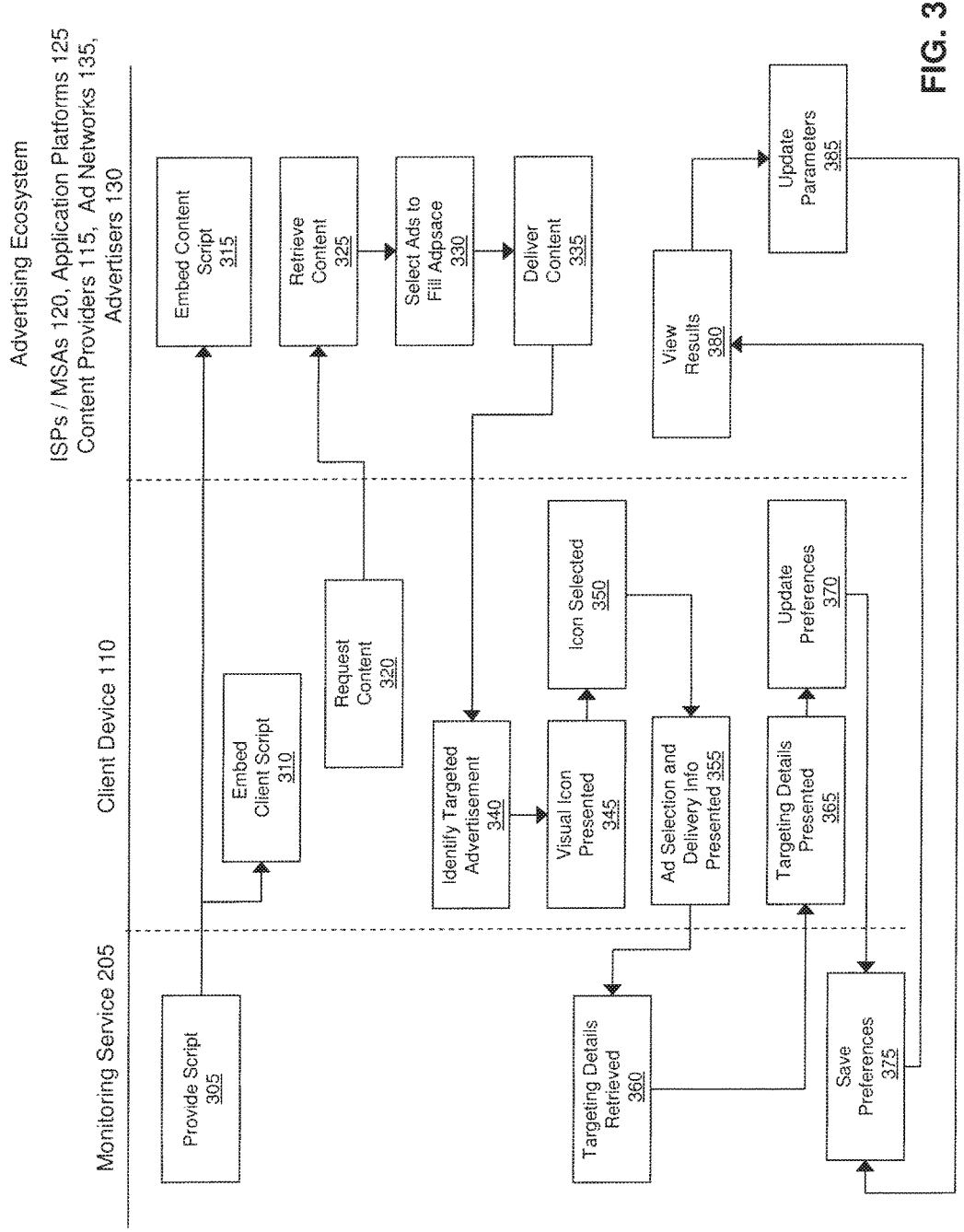
FIG. 3 is a flow-chart illustrating, in general, various steps in a process of providing consumers with information related to behavior-based advertising according to various embodiments of the invention.

Referring now to FIG. 3, a method for providing consumers with access to information about and policies governing the use of targeted and behavior-based advertising includes interactions among the monitoring service, the client device 110 (operated by the consumer or user) and one or more entities within the advertising ecosystem, 115-135. Initially, the monitoring service provides one or more scripts (STEP 305) that can be embedded in client software (STEP 310) and/or content (STEP 315).

The scripts (including, but not limited to HTML, JavaScript, Flash scripts, etc.) may be embedded in a web page, mobile page, Flash page, application and/or advertisement and implement the notice discovery and notice generation processes described below. Once deployed, the scripts may be written to and/or executed on a web page when an ad targeted to particular user behaviors is served, when an ad collects data that may be used in the future for the purposes of behavioral targeting, and/or when a data collection event occurs on a web page that is independent of a serve event. If implemented at the advertiser, ad network, ISP, content provider or application platform, the script may be embedded into the HTML code of a creative unit, into the scripts that are used to collect data about a consumer, or into the ad serving system that is responsible for serving the ad or data collection code. The script may also be embedded in a number of other ways, including direct integration with ad delivery systems, direct injection at the ISP/W AN/LAN level. If implemented at the client device, the scripts may be part of a browser toolbar or other application extension, as well as other software (e.g., operating system software, downloaded apps, etc.) on the end user's device. In some instances, the script may be integrated with other security software applications provided by commonly-known anti-malware software providers such as Symantec, McAfee, and Norton.

The scripts may include various parameterized HTTP requests that are made by the script, commonly referred to in the advertising industry as "tags." The tag (or tags) may be parameterized with variables that may be used to inform consumers about the origin and attributes of the entities collecting and using ad data, as well as their use practices related to such data.

Examples of such parameters include:
CAMPAIGN_ID—A unique identifier for the code, keyed off of an ad campaign, such that any ad running in this campaign will have the same script code attached to it.
SERVING_SYSTEM_ID—Identifies the serving system that serves the ad to the web page.
DATA_CONTRIBUTOR_ID—An array identifying other parties that contributed data used in the serving of the ad, such as information about a user's past behavior on the web.

URL—An optional parameter to identify a top-level URL or domain of the web site serving the ad, which may be used in instances in which the script is served into an IFRAME or into nested IFRAMES. For example, the system that is writing the HTML script to the web page may have visibility into the top-level URL and therefore may pass this information to the script.

The type, number and format of the parameters may, of course, differ depending on the particular implementation and does not limit the scope of the invention in any way. Other campaign-specific parameters may be stored on a central server. These may include:

DO_NOTICE—A binary value representing whether the system is to serve notice to consumers if the system determines that existing notice is non-extant or insufficient.

STYLE_INFORMATION—Files and images used to give a custom style (a "skin" or "private label") to the notice that a consumer sees.

Referring again to FIG. 3, as users navigate web sites, request content on a mobile device, receive email and other messages (STEP 320), members of the advertising ecosystem interact to respond to the user's request for content. In one implementation, a content provider retrieves the requested content (STEP 325) from one or more content servers or, in some cases, secondary content providers. In many instances, the format of the content includes sections that are meant to be filled with ads when the content is served. In some cases, the content provider 115 subscribes to an ad network 135 that aggregates ads from numerous sources (e.g., multiple advertisers 130, other ad networks 135, etc.) and provides the advertising content to fill the adspace (STEP 330). In other cases, the content may be provided to an application platform 125 (e.g., Facebook) which may in turn enhance the content with ads from various sources. Once all ad spaces are filled, the content is transmitted to the user (STEP 335).

In instances in which the scripts execute on the client device 110, targeted advertisements are identified (STEP 340). To identify instances of behavioral targeting, the scripts may include or invoke one or more discovery engines, which are the mechanisms by which the system interrogates the web page for signs of behavioral targeting and other relevant activity. Such activities include indications that entities are collecting or using data that relates to behavioral targeting and evidence that those entities (as well as the web page itself) are giving notice to the consumer with regard to these activities. Categories of discovery engines include pattern matching engines, DOM crawling engines, JavaScript object discovery engines, microformat discovery engines and meta-data listening engines. Pattern matching engines use regular expressions (and other text search capabilities) to look for specific patterns in web page source code. The text may be URLs from known entities, known JavaScript used for targeted advertising purposes, etc. DOM crawling engines inspect the current page's Document Object Model (DOM) and identify the presence of well-known or easily-identifiable elements. Examples include HTML elements that signify the presence of a seal from another monitoring platform (e.g., the TRUSTe or BBB Online seals), SCRIPT tags with well known source URLs, etc.

JavaScript object discovery engines search for JavaScript objects and/or well-known variables that are frequently instantiated on a page by third party advertisers. These objects may contain, for example, data about a delivered advertisement. One particular engine can discover the presence of data passed among entities within the advertising ecosystem. For example, one entity may indicate that they are using data from party X, so that another entity can read display that information to a user. Microformat discovery engines identify elements on the page that are tagged with well-known indicators according to current micro-formatting practices. For example, one common micro-format pattern tags HTML elements with a well-known CSS class name, which a discovery engine can search for to identify online behavioral advertising (OBA) data collection, such as:

<script class='oba_data_collection' src='http://adnetwork/collect.js'></script>

Micro-formats can also be expanded to include compact, text-based descriptions of what the entity collecting data intends to do with that data. For example:

<script class~'oba_data_collection COL SHR NPI' src~'http://adnetwork.com/collect.js'></script>

In this case, the 'COL SHR NPI' parameter may include descriptions of what adnetwork.com is going to do with the data it collects (e.g., 'not share with third-parties, not collect personally identifiable information', etc.). The system may then present this information (in a human-readable format) to a user as described below. Micro-format discovery also considers instances in which JavaScript execution is prevented due to certain conditions such as device capabilities (some mobile browsers have JavaScript off by default) or security restrictions (third party JavaScript disabled by corporate policy or a security extension such as NoScript is installed).

Meta-data listening devices may also be used to discover advertising components embedded within content. For example, many interactive and video ads are delivered through players (plug-ins) such as Adobe Flash, Apple QuickTime, or Microsoft SilverLight. While providing significantly enhanced functionality and a standard presentation format to content providers, the same advanced processing and communication capabilities often allow for the inclusion of "malvertising" (malware disguised as ads). Because of this, many publishers, especially in the social media space (MySpace, Facebook, etc.) disable the ability of these players to modify the web page or data structures using scripts on the page. In the case of Flash, for example, the allowScriptAccess attribute manages this function. In these cases, the player cannot directly communicate meta-data about ads. For example, the player will not be able to populate a CLEAR data structure. Therefore, a meta-data listening discovery engine may be used to implement a local inter-process communication mechanism for exchanging data with these types of players when JavaScript data structures cannot be directly exchanged.

For example, two Flash movies (SWF files) from the same domain on the same machine can communicate directly, across frames, if necessary, using the LocalConnection object (flash.net.LocalConnection). This communication is invisible to other scripts and Flash movies from other domains. Cross-domain communication can also be enabled through the parameterization of the Security class allowDomain( ) and allowinsecureDomain( ) methods. Similar methods of communication exist for Java applets, Microsoft Silverlight and other browser runtime plug-ins. In this example, the discovery engine instantiates a Flash "listener" object by dynamically generating the appropriate DOM elements. Since this object exchanges JavaScript with the web page, it can be used as a conduit for other information and page parameters. Another Flash object communicates encoded data structures to the listener object and the listener object then translates the structures to data structures in the web page that can be discovered using one of the mechanisms described above, e.g., as JavaScript objects describing CLEAR meta-data.

It is important to note that due to the asynchronous nature of HTTP-based resources, how they are loaded in web pages and how scripts process inside pages over time, the discovery engines may execute periodically, either as a result of certain events, frequency parameters or based on timeouts, etc.

The process and its components are designed to have minimal impact on consumer experience and page load time. Content requests (STEP 320) from the client 110 to a content provider 115 (or other file storage system) requests a static file that can be cached by a consumer's browser. The HTML scripts gather context about the web site and uses the context information to determine which file to request next. For example, a main script requests a file of the format [CAMPAIGN_ID]_[WEB_SITE_URL].js s—and if the campaign ID is "123" and the requested URL is http://sports.yahoo.com/baseball, the file is referred to as 123_sports.yahoo.com-baseball.js. If this file does not exist, the file [CAMPAIGN_ID].js (the file name being "123.js") is returned, or the HTML script requests the file [CAMPAIGN_ID].js. This second file contains specific information about the campaign (and URL, if found), such as the entities collecting data on the URL, information about all entities found (such as a privacy policy and disclosure links, names, opt-out information, and custom marketing messaging), and information about the style (icons, CSS) of the notice. If the advertiser has specified that the system should not provide notice (even when existing notice is insufficient or non-extant), some of the above information (including that about notice style and contents) may not be included in these files. The files can be cached by the browser for subsequent recall without having to request the files from the server.

Because the HTML scripts may not have total access to the entire HTML page on which they are served, additional context about the page (URL) may be needed. The additional context that the scripts request from the content provider 115 or other server may be data acquired by other sources, such as from web crawlers, panel data from a number of users who have client software installed on their machines that send data to central servers, or from web browser extensions (or 'add-ons'). This data contains a list of advertising-related entities discovered on the page by these other sources, such as that a third party server (i.e., not in the domain of the web page) managed by a particular entity that uses behavioral targeting is receiving requests from the user's browser, that data about the user's browsing habits is being collected and stored by a third party in its own data stores or in a cookies on the browser. By combining data from these external sources with data from the 'real time' HTML scripts, a full picture of all behavioral targeting activity may be gathered.

In some situations, the scripts and/or discovery engines embedded within or operating on a Web page needs to know certain attributes of the top-level page such as the URL, or portions of the URL. In many implementations this may be straightforward, but this is not the case if the script is operating in a context where the browser security model prevents this determination, as in the case of scripts executing inside of nested IFRAMES. In the case of online advertising, nested IFRAMES are typically used by exchanges and other intermediaries that resell unused inventory of brand-name publisher real estate at remnant prices. The nesting is done both for security reasons and to protect the anonymity of the publisher. As such, ads delivered within nested frames poses challenges for online advertising monitoring and compliance platforms trying to record the incidence of certain activities in the context of the site/page where they are being presented.

Therefore, in some embodiments, scripts executing inside a doubly (or more) nested IFRAME determine attributes of the top-level page without making the top-level page address and content available to any script inside the nested IFRAME (which would defeat the purpose of multiply-nested frames). Such a determination may be trivial if the ad is served "in line" with the page or within a single IFRAME. If, however, the ad is being served into nested IFRAMES additional techniques are needed to determine the top-level domain.

In cases where an ad delivery system serves an ad, and writes the TLD and page URL into the HTML scripts via a "macro," the scripts include text recognized by the serving system and can replace a variable with the page URL. For example, if the unknown URL is initially referred to as {PUBLISHER_URL}, the system receives the actual URL (e.g., sports.yahoo.com) and modifies the line in the script accordingly from "var oba_URL='{PUBLISHER_URL}'" to "var oba_URL='sports.yahoo.com.'" Cross-frame communication may also be used if the code is written in-line with the top-level domain and is in the same domain as the HTML scripts.

Another common challenge is to determine, for a given content publisher, why certain third-party tracker code or objects appear on their website. In one embodiment, IFRAME detection is used to "follow" a path back to the responsible party via the content providers, ad networks and advertisers by looking them up in the chain. In one exemplary case, after a page is loaded at the client, a scanner is initiated that marks all of the elements on the page that are identified as trackers and builds a tree-like representation of the identified trackers in relation to the top-level web page. This tree is based on the IFRAME tree structure and may take the following form:

```
top web page: cnn.com
  |
  | - Doubleclick DART (iframe)
  |           | - Quigo (script)
  |           | - Double Verify (pixel)
  |- Doubleclick DART (iframe)
              | - DoubleClick (iframe)
                  | - RightMedia (script)
                  | - RightMedia (pixel)
```

The visible structure is then recorded and stored by the monitoring service. Once recorded, the service can maintain a full structure mapping of a given web site and how any particular tracker appeared on the site.

Referring again to FIG. 3, once the various advertising components, objects, scripts and other elements are identified a visual notice element is presented to the user (STEP 345). The delivery and visualization subsystem includes a primary and secondary notice component. As described generally above with respect to FIG. 2, the placement engine 220, notice configuration and generation subsystem 225 and a delivery and visualization subsystem 230 provide the primary functions related to the reporting and monitoring of advertising practiced on the web. The configuration and generation subsystem facilitates a customizable, per-entity or per-campaign configuration of components that drive the visual styling of the notices provided to the user, including CSS files, client-defined templates, and/or primary and secondary notice icons. Marketing messaging from the third party or parties (logos, custom text, and links to web pages controlled by those entities) may also be included.

In addition to discovering targeting activities being initiated on a web page or ads on the web page, the system provides information about third party tracking and use of consumers' past behaviors directly within the page being viewed. Therefore, if the user wishes to learn more about the ad, how it was selected, the entities that selected and presented the ad, etc. the user may select the icon (STEP 350). If selected, basic information about the ad is presented (STEP 355), and, in some cases, the monitoring service will retrieve additional information about the ad (STEP 360) and the secondary targeting details notice is presented to the user (STEP 365).

The primary notice may be in the form of an icon and/or text that appears over or adjacent to an online advertisement or over or adjacent to another specified HTML element on the web page when the page loads. The secondary targeting details are displayed as a user clicks on, 'mouses over' or otherwise selects the primary component. The secondary details may include more detailed information about the ad, its source, and the behavioral targeting practices of the entities in the advertising ecosystem that were responsible for selecting and delivering the ad. Examples of such information include the name of the advertiser, the delivering ad network, intermediate ad networks, and any data providers or enhancers of the advertisement. In some cases, an optional, third-party-defined message (the third party being an advertiser, the delivering network, intermediate networks, and any data providers or enhancers), may also be shown along with links to pages on the third party's site for additional reference. Further, industry-defined messages may be provided to the consumer, with links to industry association-developed websites, such as the Better Business Bureau, the Interactive Advertising Bureau or the Digital Advertising Alliance.

In some cases, determinations are made as to what the notice should look like (e.g., text, an icon, or both) and where the visual notice is to be placed. For example, an ad may be written in-line to the page code, wrapped in IFRAME, or included in other elements like <div> tags, etc. In such cases, the code delivering the notice may be included by an ad server when the ad server writes ad code to a web page. As such, the code maybe included with several other tags that perform other functions. Because the tag produces a visual overlay (the icon and overlay with more detailed information), it is preferred to have the overlay positioned near the actual ad to which it refers, which allows for the programmatic determination of the location of the actual HTML element containing the ad.

During the execution phase of the tag, several layout possibilities may be attempted and the surrounding HTML elements then "tested" to see if they are in fact part of the ad. For example, a one-directional look-through is used if the code is to be placed after the ad. In one embodiment, a function looks through all previous elements and selects the correct ad by recursive checking through all previous elements and looking at their enforced sizes in comparison to the ad size being targeted. Once an element has been identified as the desired spot, additional checks validate how far from the anchor pixel it is, whether this spot is already anchoring a notice, and finally, if the spot is set to be visible.

Several other detection methods may be used throughout the tag, but this method serves as the default when other less robust detection methods fail to identify a valid ad spot.

Some implementations also include dynamic notice placement functionality in order to determine an optimal placement for the notices. For example, the placement may be directly over an advertisement, or over a specified element on a web page. In some instances, a web site publisher may desire that all notices be given from a particular placement on the site that they control, rather than have different types of notices be shown for different ads on their site. The publisher may then annotate an HTML element on its page, which is discoverable by the HTML scripts described above. Examples of such an annotation include:
<div id="oa_notice"></div> and <div class="oa_notice"</div>

Adding dynamic elements to the notices also addresses the problem of notice collision. Frequently, several different entities deliver ads to a single web page. For example, a content publisher may use their own ad server and put code requesting that ad server return an ad for that page. If, however, the server has no suitable ad to show, then instead of returning nothing, it may return code to the web page that requests an ad from a different server. This may occur many times before an ad is actually selected to appear on the page. As each entity delivers code to the web page, they may also deliver a notice element, resulting in many notices for a single ad. Notice tags/code described above are aware of each other, and have the ability to display a visual notice element only once. However, that one notice will contain information from all of the tags associated with that particular ad.

In some instances, the configuration and generation subsystem tracks views of the notice(s) as well as click-throughs to a third-party web site (via links in the notice). By collecting and storing such data, the monitoring service can be used by advertisers and content networks to view aggregated and time-based statistics regarding consumer behavior in response to the notices. Such data may be provided via an online service, exposed as a web service for inclusion into other web sites, or accessible via an API.

After or while the user reviews the notices, she may update certain personal preferences related to targeted advertising practices (STEP 370). For example, in some implementations the user may opt out of being behaviorally tracked or targeted by any or all of the aforementioned third parties. In such cases, when the user selects the appropriate link or clicks an object to indicate her preference, a cookie is placed on her machine indicating she no longer wish to participate in targeted advertising. The opt out feature may be global (e.g., all websites, all networks, etc.), whereas in other cases it may be specific to a particular ad network, a content provider, advertiser, and/or a product class. Preferences are then forwarded via HTTP to the affected parties and saved by the monitoring service (STEP 375). The preferences may be stored centrally, remotely (e.g., on the client machine) or, in some cases, both.

In certain instances, the entity or entities responsible for selecting and serving the ads may update parameters related to the notice provisions provided to the users. For example, a frequency capping feature may be provided which, when activated, avoids redundant or excessive notices. Using this feature, an advertiser, content provider or ad network can specify that certain notices (or all notices) only be shown at or no more than a particular frequency (e.g., one inn times per period day) to any particular user. To enable this feature, the monitoring service stores an indication of which notice(s) were delivered and at what time the notice was shown to a particular user based on a client-resident cookie. In some cases, the system also allows consumers to block subsequent notices from a particular advertiser or, in some cases, globally. This preference is also stored in a browser-resident cookie which, depending on how scripts are implemented, may use Flash helper objects to persist as a Flash cookie. A configuration variable in the main HTML script may be used to specify how long these consumer preferences will be honored, before a reset is triggered or required.

In some implementations, entities within the advertising ecosystem can access reporting, analysis and management features of the monitoring service. For example, a content provider may be interested in the frequency that its site visitors request detailed targeted advertising information regarding ads served on its site. The content provider may, in some cases, subscribe to the monitoring service and remotely access and view certain online reporting capabilities that provide such information (STEP 380).

The monitoring service may also collect, store and provide access to entities' privacy policies and general policies about advertising targeting-related practices. This policy mining capability can be performed manually (in an in-house, outsourced or crowd-sourced manner) by people who browse to sites and summarize policy information, by web crawlers that seek out pages where policy information is found, or by a program that reads and interprets an entity's machine readable (such as P3P) and/or human readable (such as privacy) policies. The information may be based on publicly accessible data or based on private data such as legal contracts or other agreements that describe the relationships, obligations, and restrictions among the various advertising ecosystem participants. Examples of certain restrictions or policies that may be in place for certain participants include:

- only showing ads to people who have opted in to be targeting in some manner;
- only showing ads on sites and in applications that are certified in some manner, e.g., hold a TrustE certification or are integrated with the monitoring service described herein or other such similar service;
- an ad cannot be shown next to objectionable or sensitive content; and/or
- ads from secondary advertisers can only be executed/served/delivered through entities having privacy policies that are equally or more stringent than the primary advertiser's privacy policy with respect to certain policy parameters.

This data can be combined to enable the provisioning of additional services to the participants in the advertising ecosystem as well as the consumers to whom the ads are sent. The data can be used to develop privacy safety ratings and other consumer-based measurements for web sites, content providers, application platforms, and/or downloadable applications that can be provided to users upon request or reported on a publicly available web site. For example, a consumer may have a "first-party" relationship with a primary web site (i.e., he has purchased from the site or is a "member" of the site), yet there may be other third-party entities interacting with that browser and delivering ads on the site. These "secondary" entities may have 'looser' privacy policies than those of the primary site, which the user likely acknowledged. If the primary site does not disclose to the user the presence of the secondary entities, he has no way of knowing about the looser policies and that his actions on that site may be used by the secondary site for behavioral and/or targeted advertising purposes. Using the techniques described herein, the secondary sites' practices are identified and made available to other ecosystem participants, who may then integrate the data into their own ad targeting systems. If desired, advertisers can specify that their campaigns should include only 'privacy safe' sites, to sites with a certain privacy 'rating' or that meets a minimum privacy 'threshold.' The data may be made available to the other parties via a real-time API and/or via 'site lists' delivered through a protocol like FTP.

In some cases, the data may also include one or more "white lists" that includes a list of entities that the system assumes to be compliant with certain privacy and notice provisions, and therefore does not require real-time verification. White-listed entities can be any type of entity that participates in online behavioral advertising, including publishers, data aggregators, data collectors, and ad networks. In some cases, these entities may "pre-register" by completing and submitting evidence (e.g., a questionnaire, sample code, affidavits, etc.) that their sites comply with various privacy policies and/or best practices. In some cases, the maintenance of white lists may involve various types of testing and monitoring technologies that verify behaviors consistent with maintaining "membership" to the white list. For example, a web site may be white listed because it is known to have certain technologies and processes which are known to allow other entities to be white listed.

The data may also contain one or more "black lists." In this context, an entity listed on a black list is known to always be non-compliant. One example is a web site that has no privacy policy or notice of disclosure that relates to behavioral targeting practices, or sites that are known to drop adware, spyware, or other malware onto client devices.

Once a minimal amount of data has been collected about the behavioral targeting activities and privacy features of a website, the monitoring service determines a privacy risk of the site. The risk can be presented to advertising clients as a privacy rating, which advertisers can use when choosing the sites on which their campaigns will run. For example, a highly brand-conscious advertiser may choose to not deliver ads to sites with low privacy ratings.

In addition to determining a privacy and/or security rating for a particular site or ecosystem participant, the monitoring service also tracks consumer actions regarding the primary and secondary notices, as well as their selection of preferences. For example, the service receives a message from the client device each time the user clicks on a 'primary notice' icon or text, when a consumer clicks on any link in the 'secondary notice, and when a consumer opts-out from any parties from within the secondary notice. Using this data, the service can provide reports to advertisers and other ecosystem participants that detail how often consumers are opting out of targeting advertising from their advertisements. Advertisers, content providers, application platforms and other participants can then tailor marketing messages included with the notices in an effort to influence these metrics. As an example, an advertiser may modify the text of a primary notice to try to drive more people to click on a link where they can get more information, or they may edit text in order to steer people away from opting-out. This process can also be automated, such that an ecosystem participant may provide multiple different text messages to be included in the notice (they may also give different icons, sets of graphics, CSS styles, etc.) as well as an optimization metric, such as 'minimize opt-outs,' 'maximize clicks on links that go to my site', etc. The service then randomly serves both types of notices, tracking the results during a 'learning' period, and in some cases may switch to serving only the set that best meets the client's desired goal.

Many video and interactive advertisements and data collection scripts use Flash or similar "players" as the delivery mechanism because current browsers do not support the rich media, graphics and processing capabilities of Flash, SilverLight and Java in page-based script. In these cases a different architectural approach is used to capture information embedded within the ad. For simplicity, the following discussion will be restricted to a description of how Flash-based video players interact with the monitoring platform, however it should be evident that the teachings are readily transferrable to other rich-media platforms.

Flash video players with advertising and/or data collection capabilities include three components: core player code, data collection I analytics code, and advertising (targeting/ad delivery/ad interactivity) code. Typically, video ads are integrated into the player when rendered at the client as opposed to stitched into the stream on the server. Exceptions to this include some mobile and interactive television ("iTV") scenarios. Measurement and other ad components may also be provided by third parties (analytics vendors such as VisibleMeasures and video ad networks such as ScanScout) and inserted in the player by the player owner (often a publisher, sometimes an ad network).

A first approach uses a component-based distribution model. In this case, the content provider configures a player to serve ads for that provider. Generally, the content provider uses the same (or very similar) components to standardize data collection processes across all instrumented players. One drawback, however, is that the adapter layer between the publisher's player and the ad provider's component can still vary greatly depending on the structure of the player. This model is typically used in complex advertising models because it offers the most control over the interaction between the publisher's content and the ads, resulting in a better user experience.

Another approach uses a standardized XML template (e.g., DART or Yahoo APT) that defines the type of ad the player is allowed to show. In this case, the player (regardless of which entity in the ecosystem owns or operates the player) enables playback and handles the display of the ad. This type of model is more popular in cases where the publisher is a content delivery platform (e.g., Brightove) because it supports many different ad providers within a single player platform. Recently, efforts towards standardization have resulted in implementations such as IAB's VAST (the "video ad serving template" XML specification) and VPAID (the "video player-ad interface definition" API).

Typically, the player orchestrates calls to the ad serving component. The VPAID handshake model is one example of the where the player determines when an ad should be played and then directs the ad serving component to do so. In these cases, the ad serving component takes inputs from the player and makes a call to the ad network which returns a structured payload, typically in XML format. Within the payload is a link to the stream that includes the ad or an image (which, in some cases may be in shockwave format) for an overlay. In typical implementations, the image of the ad is then provided to the "main" code of the player which determines how to display the ad (pause video, etc.). Typically, overlays are displayed by that main code as opposed to allowing the ad component to directly render the overlay.

In many cases, the core player code and the ad component in the player are often provided different entities, and as such introducing compliance capabilities in the player poses challenges. Even when using a VAST-like XML-based standard to carry all the compliance-related metadata, compliance logic still must be implemented without requiring an extensive integration between the core player code, the ad serving code and the compliance code to implement functions such as the notice display.

One particular approach to capturing the right meta-data in a non-invasive manner captures the XML payload associated with a video ad. One implementation of this approach "listens" to the event generated when the XML payload is received as communications in the Flash player return results through callbacks. Since this is specific to an object inside the ad component, the ad component requires registration of a third-party listener. A compliance component is given access to the object that loads the ad response from the server before it can add an event listener to it using a scripting language such as ActionScript. Security restrictions may also be put in place if the two components live on different domains and if the code is integrated directly into the player. Therefore, the ad component can affect a single logical API call to the compliance component by providing information about the object and the event on that object generated when the XML payload comes back, and the compliance component can then capture relevant meta-data. This technique can implemented through a direct method invocation or, for looser binding, via the ad component firing an event received by the compliance component.

Once the meta-data is available to a compliance component, notices may be displayed (in icon and/or detail form) and facilitate user-initiated and/or automated events such as stopping video playback, closing a browser instance or tab, etc. In effect, the notice provides a means for interacting with the player within a privacy and security context.

The metadata may then be communicated from the video player to the enclosing web page either directly through JavaScript or via local communication as described above for the metadata listener discovery engine. Video players also identify when an ad is active so that the overlay can be displayed by the notice logic on the page. This architecture may be implemented in a manner similar to that of VPAID over Local Connection. With the combination of XML, payload capture and integration with external mechanisms for notice display, it becomes possible to implement a single, easy to integrate compliance component for use inside Flash-based video players with advertising capabilities, providing notable improvements over the current state of the art.

In some cases, more than one ad may appear on a single page, and the scripts that instantiate the notice or notices should do so for each individual ad. In order to maintain acceptable browser performance, the code is designed to prevent additional remote script loading when a version of the tag payload is already present. This reduces the required bandwidth where there are several notices to be shown on a particular web page because the same code is used for each notice and does not have to be downloaded again.

The embed code (e.g., the JavaScript copied into a destination ad) looks up a parameter that is set by the payload code (the of code that is downloaded every time and embed code is encountered), and if the parameter has not been set, the embed code allows the remote payload to be loaded. If, however, the parameter is present in the page the JavaScript has already been loaded thus there is no need to retrieve it again.

Figure 4:
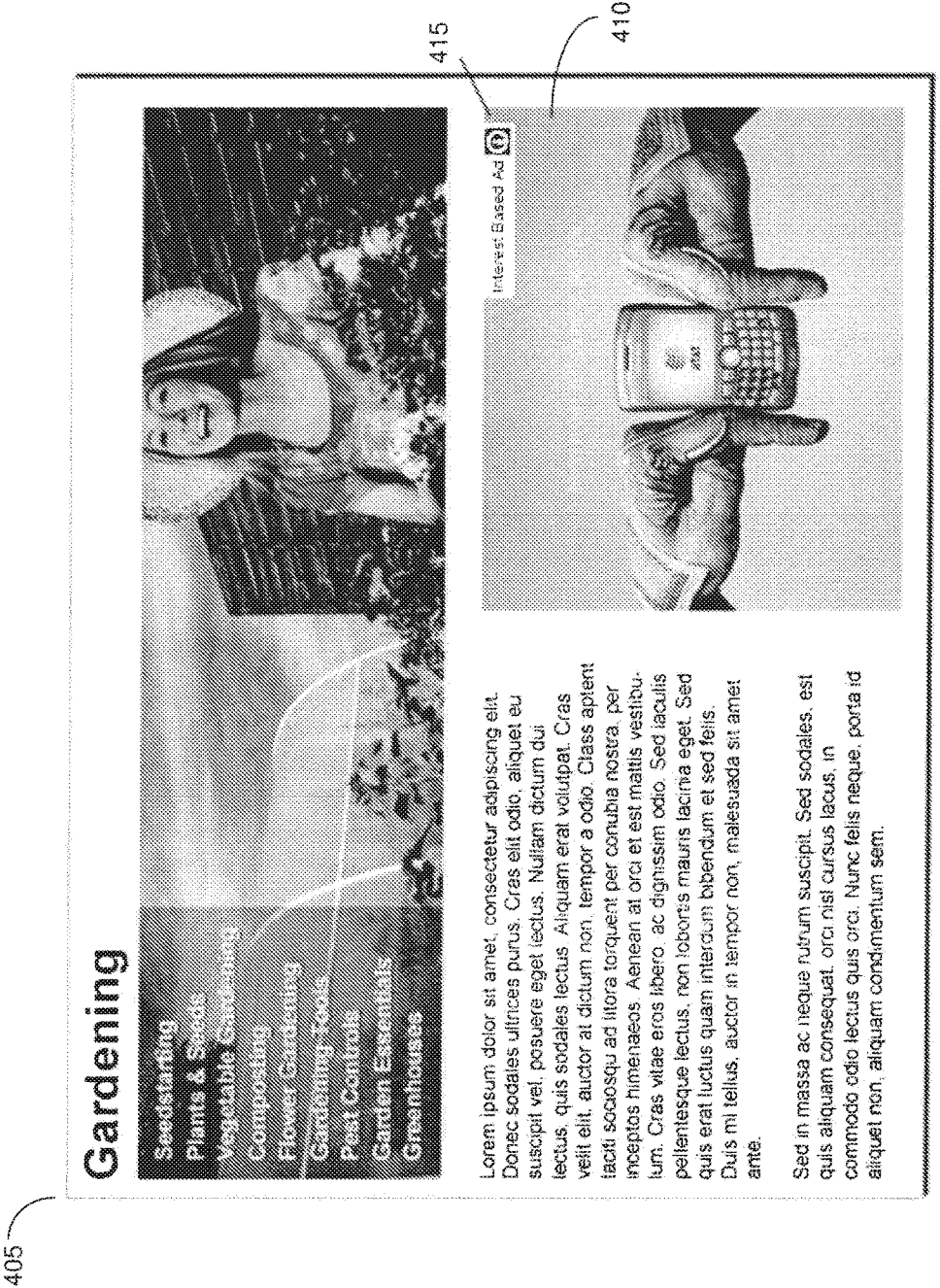
FIG. 4 is a screen capture of a web page into which a targeted ad has been injected along with a primary notice in accordance with various embodiments of the invention.
Figure 5:
FIG. 5 is a screen capture of the web page of FIG. 4 showing a secondary notice regarding targeted advertising occurring on the page in accordance with various embodiments of the invention.

FIGS. 4 and 5 are screen captures that include examples of primary and secondary notices. Referring to FIG. 4, a web page 405 may include one or more advertisements 410 integrated into the page content. As described earlier, the ad may be placed by the content provider, an ad network, or other entity and may be based on prior view and/or purchasing habits of the user viewing the page 405. In accordance with various implementations of the present invention, the existence of the ad 410 and the fact that the ad is targeted to the user based on previous behaviors is detected and a primary notice icon 415 is included on top of or along side the ad 410. The user may select the icon 415 if she is interested in learning more about which entity or entities are responsible for the ad, and, in some cases, their privacy and security ratings, policies, and other practices.

FIG. 5 illustrates the same web page 405 as shown in FIG. 4, however the advertisement 410 has been replaced with a secondary notice 505 that includes general information about why that ad was selected and what entities served the ad. The notice 505 may also include HTML links 510 that bring the user to a separate web page (which may be hosted by the monitoring service or one of the entities responsible for serving the ad) to view additional information, view personal preferences, and in some cases modify certain settings related to targeted ads (e.g., elect to opt-out of targeted advertising altogether).

Figure 6:
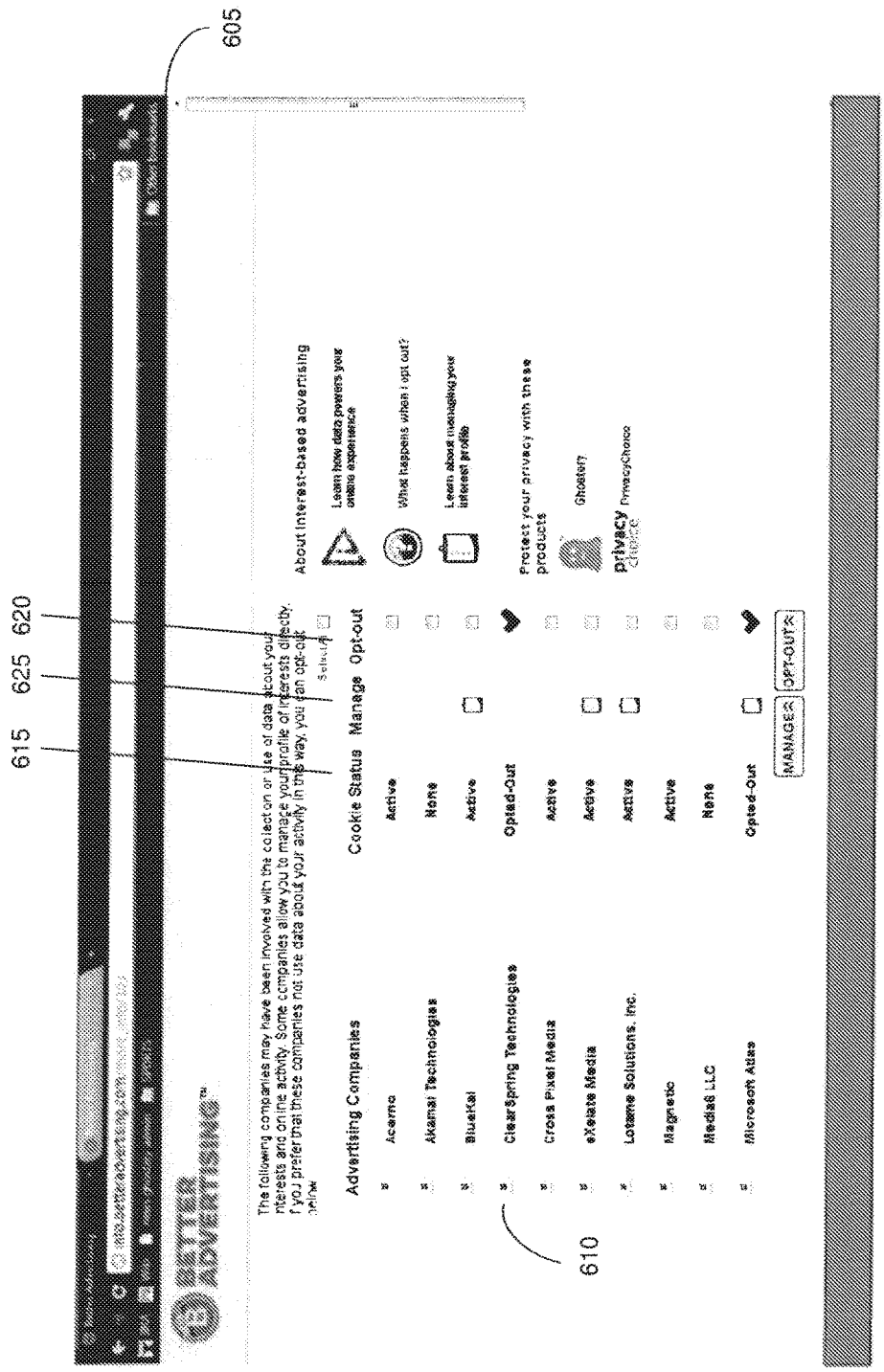
FIG. 6 is a screen capture showing detailed information and preference options regarding targeted advertising occurring on a web page in accordance with various embodiments of the invention.
Figure 6A:
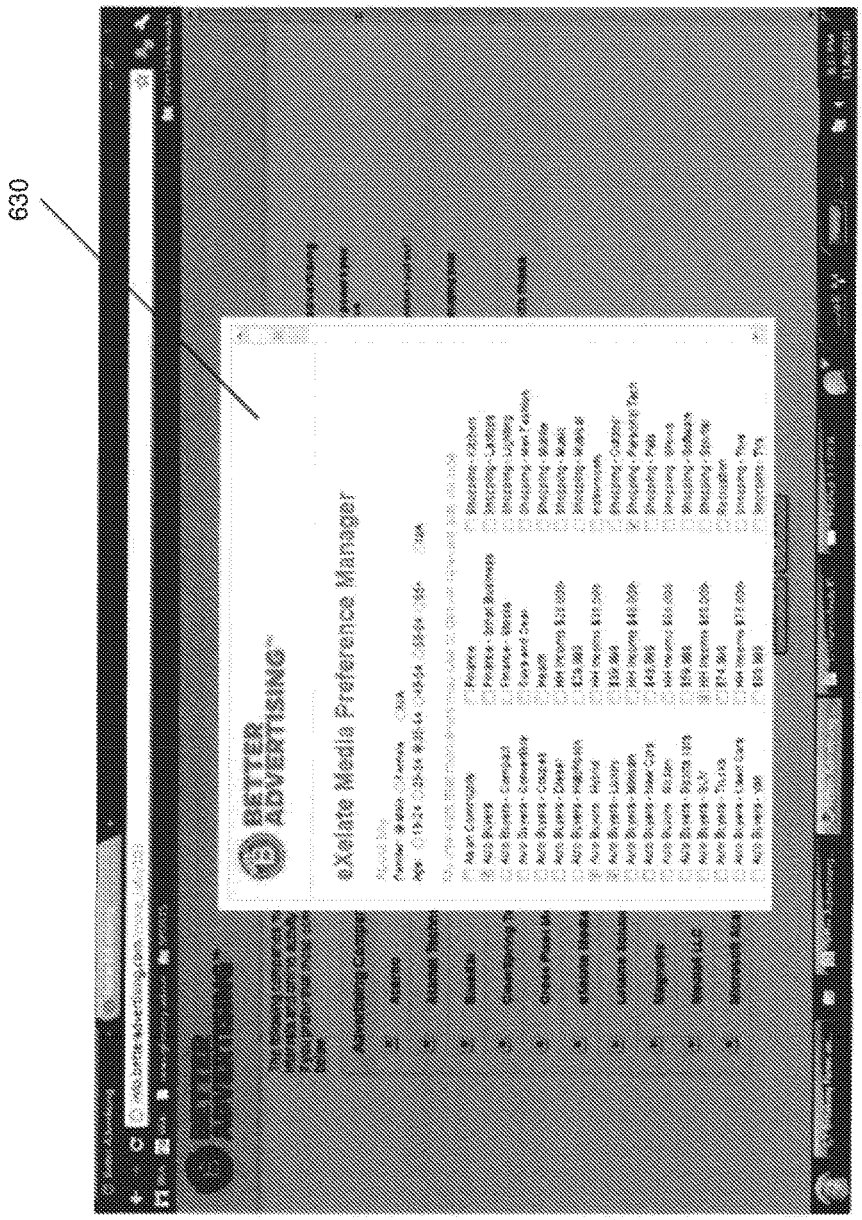
FIG. 6A is a screen capture showing user-specific demographic and tracking preferences in accordance with various embodiments of the invention.
Figure 7:
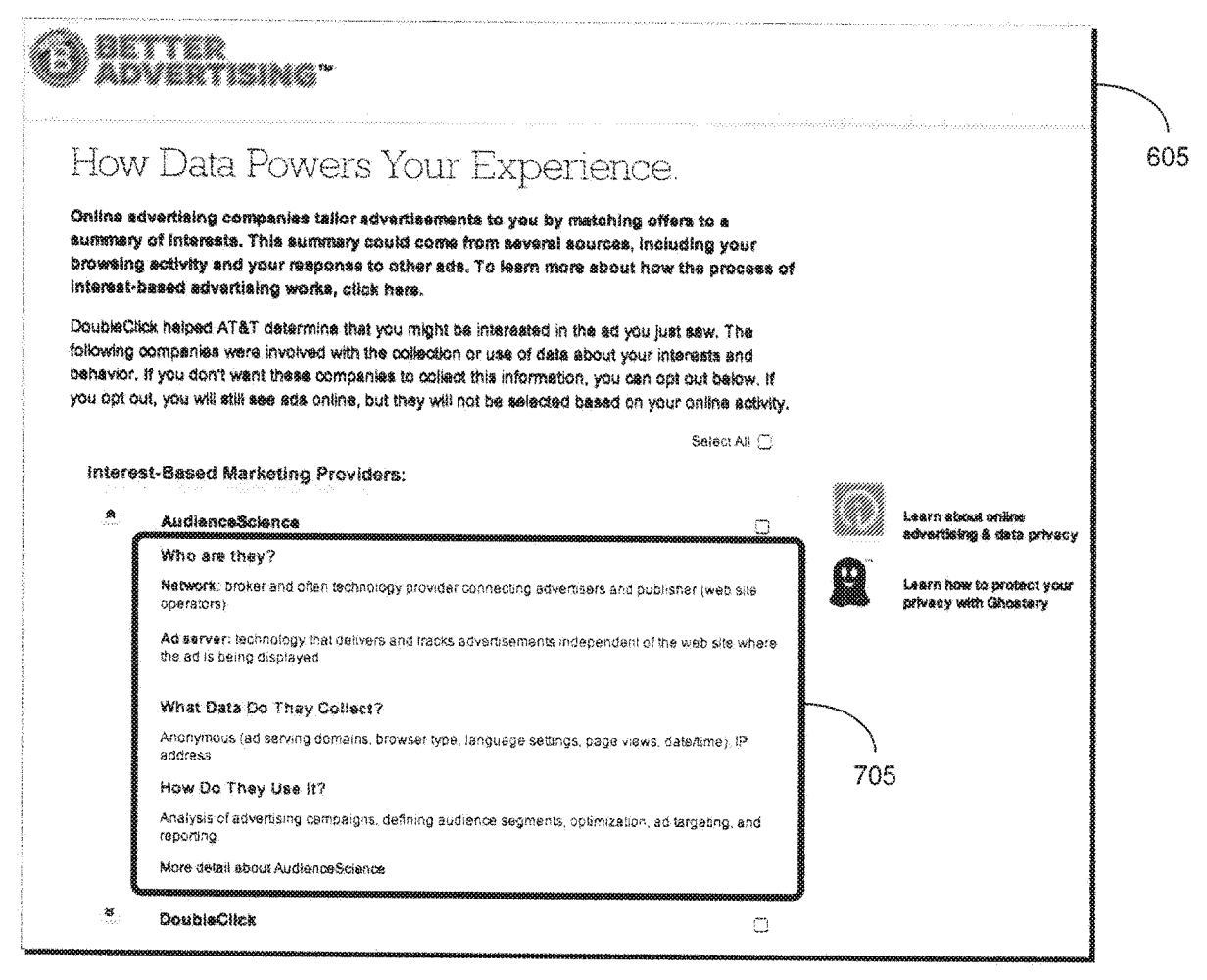

FIG. 6 illustrates one example of a web page 605 hosted by the monitoring service that allows a consumer to learn more about the sources 610 of advertisements served and the ability to view and possibly alter personal preferences regarding the tracking mechanisms used by the sources. For example, the web page may include a column 615 indicating whether or not that particular entity uses cookies, whether the cookie is active, and/or if the user has opted out of or disabled cookies for that entity. Another field 620 can indicate whether or not the user has opted-out of receiving ads or allowing behavioral tracking at all for a particular entity. A column 625 may allow users to selectively manage more detailed demographic and other behavioral data about themselves that may or may not be used to determine relevant ads. FIG. 6A illustrates one example of a screen 630 at which a user may provide and/or confirm such information. In some cases, the listing of sources 610 on FIG. 6 includes links to more detailed information about the individual entities. FIG. 7 illustrates one example of the detailed information 705 provided regarding a particular ad network 610.

A user's opt-out request may be included in a list of white-listed sources (i.e., the management platform's URL or the URL of a trusted source is known), thereby ensuring that the request was originated by the user and not a third party acting on the user's behalf. Moreover, the management platform defines and uses a protocol by which a user's opt-out status for a particular site can be queried by a third party and shown to the user along with similar statuses from other sites. The protocol also defines a method for validating that an opt-out cookie was successfully set.

Different constituents within the advertising ecosystem may have different levels of access to the data, depending primarily upon their entity type and access rights. Data points stored include:

| | |
|---|---|
| TAG_START_TIMESTAMP | The time that the first script began execution. |
| USER_AGENT | The user agent of the consumer (browser type and version, and language setting). |
| CAMPAIGN_ID | The campaign that the script is monitoring. |
| SERVER_ID | The ad serving system that served the campaign. |
| DATA_ENTITIES[ ] | An array of other BT-related entities present on the same page that the campaign was served into. |
| GEO_ID | The geographic region of the consumer. |
| URL information | The actual URL of the top-level domain where the campaign was served, or a URL_NOT_FOUND indicator. |
| IFRAME_LEVEL_ID | Indicates if campaign was served into an IFRAME, or into nested IFRAMES |
| IS_URL_WHITELISTED | Indicates if this URL (web site) was on white list. |
| DISCOVERY_ENGINE results | All the discovery engines that ran on the page where campaign was served, and what the engines discovered. |
| IS_COMPLIANT | If 'yes', campaign was served into a compliance context. If 'no', not. |
| NOTICE_GIVEN | 'yes' if the system served notice. |
| OPT_OUT_STATUS | Indicates whether consumer's opt-out status was checked (in real time), and if so, what results are per network that was checked. |
| CLIENT_LINK_CLICKED | 'yes' if consumer clicked on the link to the client's web site |
| NOTICE_VERSION | The version of the client notice that was shown to consumer (if shown) |
| INFO_LINK_CLICKED | 'yes' if consumer clicked on the link to the industry web site to get more information about behavioral targeting |
| CONSUMER_OPT_OUTS | An array of entities that that consumer opted-out from (from secondary notice), if any. |

The service also provides users with a web-based wizard that guides them through the process of generating a tag (HTML scripts) that may then used to monitor campaigns for privacy-safe compliance. During this process, users may also select the style of secondary notice as well as define any custom messaging to be included in that notice.

In certain embodiments, the monitoring service also includes a monitoring "lab" for performing different types of checks and validations on web sites across the Internet. The lab may be made up of a number of physical computers acting in concert, it may comprise a single large-scale computer, or, in some cases a collection of virtual machines operating across many devices. In some instances, the devices used to execute the discovery and collection functions of the lab are client devices belonging to users who have agreed to assist in the data gathering and analysis functions, similar to the SETI-AT-HOME project. As one example, an 'Opt-Out Lab' crawls advertiser and network opt-out pages and collects information that is stored in the browser (via browser cookies and LSO's) after a user has opted out. Initially, a blank browser profile is created with no existing cached files or cookies, and the browser is directed to the opt-out URL. It automatically executes any necessary steps to complete the opt-out process, by clicking a button, following a link, selecting options, etc. Once a confirmation page is reached, or a page has finished loading and there are no further instructions to follow, the lab looks for the cookies collected. It then saves the browser cookies and LSO (Flash cookies) in a database with a reference to the URL from which they were created. Any errors encountered during the opt-out process are reported and no data is saved to ensure optimal results. These set of steps are repeated for each different opt-out URL.

Another instance of the "opt-out-lab" validates opt-out processes to validate that companies are not tracking users once they have opted-out of targeting based on information saved into the user's browser after the opt-out process has been completed. The lab performs a regular opt-out, as described above, And using the same browser session from the opt-out process to ensure opt-out cookies are present in the browser, the lab visits websites where companies have placed trackers. A list of websites is gathered and the lab crawls through each one, trying to find some trackers that belongs to the company the user has opted out of. It visits enough websites so that it finds some that contain trackers associated with the opt-out. At the end of the process a list of browser cookies and Flash cookies are compiled and filtered to the known domains of the company in question. This resulting list of cookies is then saved to a database. In some cases there will be no cookies saved, and this will be noted. These set of steps are repeated for each different opt-out URL.

Another instance of the lab detects privacy notices provided by entities and an automated system for verifying the non-compliance of behaviorally targeted advertisements on the Internet. Upon visiting a given URL, the lab detects all advertisements on the page and any associated notices. Depending on the type of request, a screenshot of the entire page is captured if an advertisement without a notice is detected. In addition, the date and time of the sample, the browser that was used, the IP address and location of the machine from which the sample was taken, and any relevant cookies that were found on the machine at the time of sampling are also captured and stored in a database for later review by a compliance officer or other party. Privacy policies can also be periodically scanned by a lab of computers and monitored for material changes. These changes can be displayed in a user interface.

In addition to allowing the advertisers, ad networks, data aggregators, and ad exchanges to view and manage data regarding users' interactions with their content, these entities often store information about users to use for targeting more relevant ads. This information ranges from simple opt-out preferences, to information about users' behaviors and interests. However, it can be difficult for consumers to manage these preferences globally. For example, there is no easy way for a consumer to define a global policy that limits targeted advertising to companies that do not share their data with third parties or have well-enforced privacy policies. To do so, users typically must visit the privacy policy pages of a number of ad networks, understand each networks' policies, and opt-out individually of them by locating the 'opt out link' on each of those web sites. In addition, simply finding out which ad networks and companies are responsible for the ads can be difficult. Under pressure from advocates and regulators, companies are also beginning to expose to users exactly what they know about them, and offer consumers a way to add, delete, and edit that information. Consumers still, however, have to visit each of those companies' web site separately to perform these actions.

As referred to above, the consumer's opt-out status (or other targeting preferences) must be known with regard to a particular content network or ad network, and/or tracking system in order to accurately implement and monitor online behavioral advertising guidelines. To address this need, the monitoring service provides a secure, scalable approach to viewing and setting consumer opt-out preferences across the entire advertising ecosystem. While many advertising ecosystem entities currently use the Network Advertising Initiative's ("NAI") opt-out tool, which uses a simple HTTP redirect mechanism to identify opt-out status. The architecture and methods described herein provides a more secure and scalable standard for any service provider to operate with entities that store data about consumers and their ad targeting preferences.

A "Preferences API" is provided that facilitates a set of services that are used to build consumer-facing tools that allow consumers to centrally-manage their online advertising preferences across all networks and exchanges. The API uses the browser as a proxy to normalize and display a user's preferences for viewing and editing. As such, the API allows entities to guide users through a series of questions and policy settings on their own browser that will manage the user's opt-out and data use preferences.

More specifically, the API allows service providers (e.g., an ISP, an industry association, a company, etc.) to offer an "opt-out wizard" for users browsing the Web through a particular device. The monitoring service can then collect and use the data to provide aggregation services to the service providers regarding online behavioral advertising activities on various content sites. In some implementations, the API allows a service provider to query a facilitator for the status of a particular user's preferences (e.g., opt-out, interest, or behavior), and initiate a change of a user's status with respect to a particular a content site.

Figure 8:
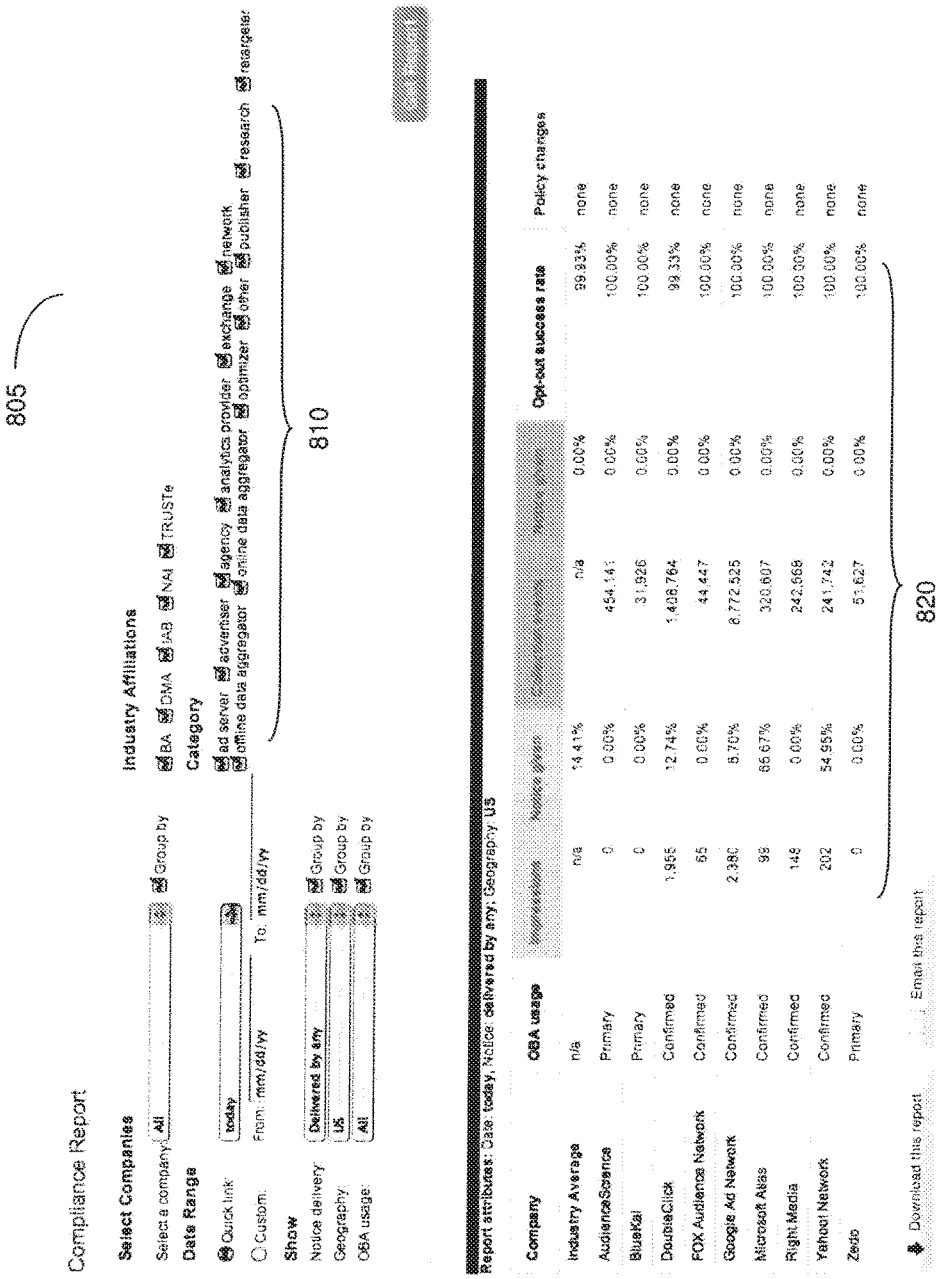
FIG. 8 illustrates one example of a user web-based report compiled from data collected from user interactions with notice provisions, according to the various embodiments of the invention.

FIG. 8 illustrates one example of a user web-based report 805 compiled from data collected from user' interactions with the primary and secondary notice provisions. The report 805 includes selection options 810 that facilitate the filtering of data based on industry affiliations (e.g., the Direct Marketing Association, TRUSTe, the monitoring service described herein, etc.) and the category of entities to be shown in the report. For example, some entities many only be interested in viewing data from like services (e.g., similar content providers) whereas others may be interested in the entire dataset. Individual companies 815 may be listed as specific members of the advertising ecosystem, with detailed information related to their use of online behavioral advertising techniques, the number of ads served (impressions), a percentage of time the primary notice was shown, how often a user interacted with the notice, the success of opt-out policies, as well as other information.

In some cases, the API functions as two separate programs—one enabling communication between the monitoring service and a content provider (e.g., an ad network, data aggregator, etc.), and another enabling communication between a service provider and the monitoring service.

In certain implementations, a top-level service (URL) ("user_service") is exposed by content providers and the monitoring service. The top-level service responds to several actions, each specified as query string parameters. Versions of the API may also be specified in URL paths in order to provide additional flexibility. An example of one such URL is http://www.adnetwork.com/oba-api/v1/user_service.

In these cases, all requests are HTTP GET requests having a path of http://DOMAIN/oba-apiNERSION/user_service. Each request to "user_service" is parameterized, using at least three parameters. An ACTION parameter instructs the service of the action to be performed (detailed in the table below), the DOMAIN parameter provides the domain of the entity requesting the operation specified in sufficient detail to allow a call to the user_service on that domain, and a KEY parameter provides a security token. The format of the token is not important, and may be treated as a string. For security reasons, tokens may be generated using strong random number generators. If a response to an operations requires a 302 redirect, the action on the redirect URL is obtained by appending "-response" to the action of the operation, unless there is an error in which case the response action will be "error."

| Action | Purpose | Additional Parameters | Success Response |
| --- | --- | --- | --- |
| Init | Initiates security handshake between parties. | domain-domain of entity requesting the operation key-requester's security token | HTTP 302:/ user service?action= init-response |
| init-response | Completes security handshake between parties. | domain-domain of entity responding to action=init key-security token provided in action=init | HTTP 302:/ user service?action= [get\|set] |
| sync-keys | Synchronize security keys | domain-domain of entity requesting the operation key-responder's security token my_key-requester's security token | HTTP 200 OK |
| get | Retrieve status of user's preference. | domain-domain of entity requesting the operation key-responder's security token name-name of preference requested | HTTP 302:/ user service?action= get-response |
| get-response | Completes get operation. | domain-domain of entity responding to action=init key-requester's security token name-the name of preference requested value-value of user's preference. | Application specific |
| set | Set a user's preference. | domain-domain of entity requesting the operation key-responder's security token name-name of preference to set value-value of preference to set | HTTP 302:/ user_service?action= set-response |
| set-response | Completes set operation. | domain-domain of entity responding to action=init key-requester's security token | Application specific |
| error | Communicate an error | domain-domain of entity responding to action=init key-requester's security token error_code-name of the error error_info-additional information about the error | Application specific |

If errors are generated for the init, get or set actions the error information is communicated via a redirect to user_service?action=error. When an error is generated during user_service?action=sync-keys, the error information is communicated via an OBA-API-Error-Code response header containing the error code and OBA-API-Error-Info response header containing any additional information. In that case the HTTP response code is 500. Samples of possible error codes are listed below.

| Error Code | Explanation |
| --- | --- |
| UnauthorizedAccess | The request is coming from a party that the responder has not agreed to do business with. |
| InvalidKey | The key parameter is invalid. |
| InvalidAction | The action parameter is not one of the specified by the spec or the entity does not implement this specific action. |
| InvalidArgument | Some other type of problem with the parameterization of the request. |
| InternalError | Another type of error. |

The process also includes various security mechanisms. For example, random, correlated security tokens for requesters and responders are refreshed for every get/set transaction. This enhances security by eliminating the possibility of replay attacks. Further, both redirects and direct calls happen against specific domains, enhancing DNS security. Third, content providers can only respond to domains in a white-list that they maintain in order to prevent leakage of opt-out information and fake opt-out requests.

Figure 9:
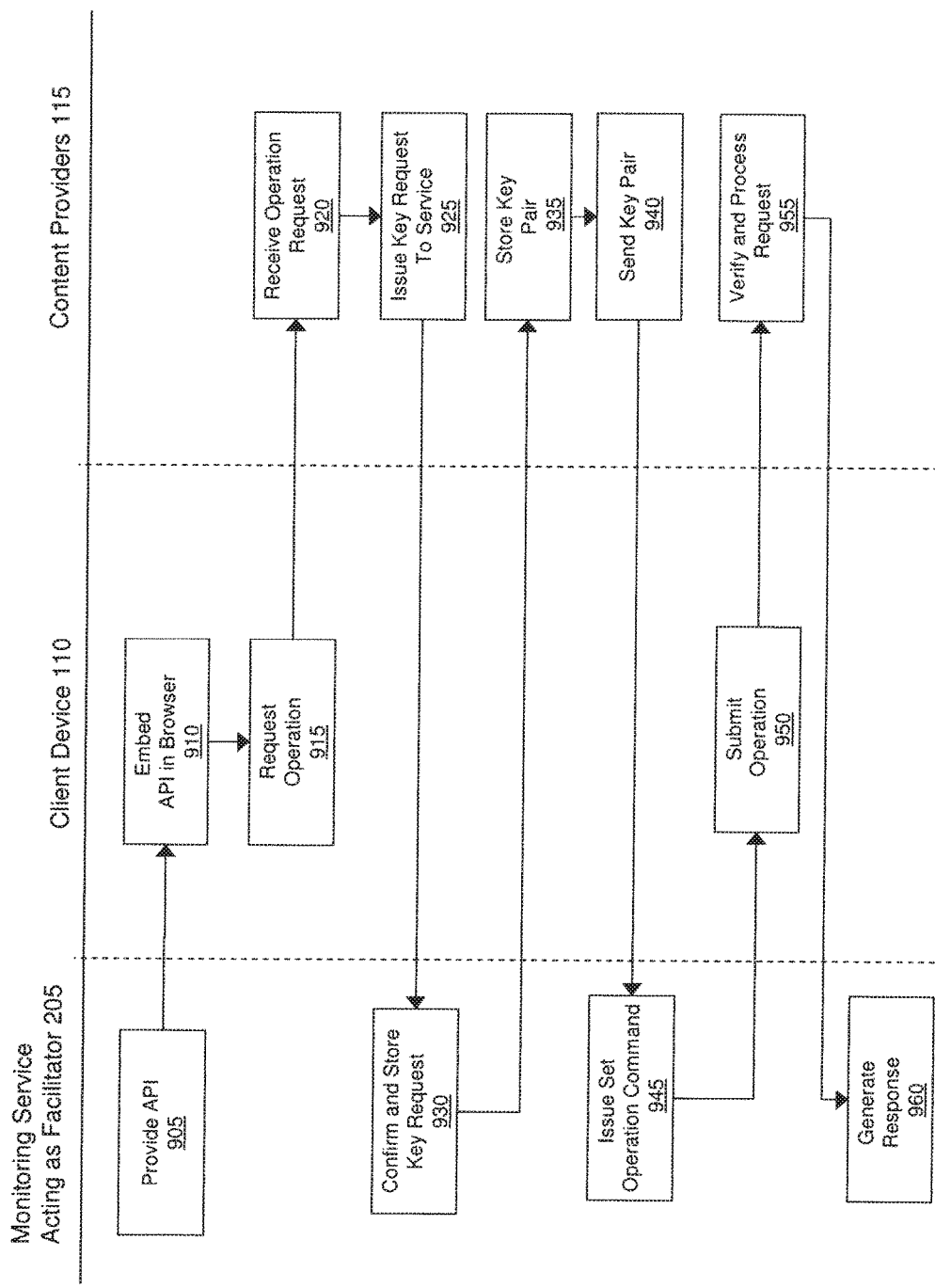
FIG. 9 illustrates a method for fulfilling a request to set a user's opt-out status, according to various embodiments of the invention.

FIG. 9 illustrates one method for fulfilling a—request to set a user's opt-out status, using the monitoring service as a facilitator of the process. In STEP 905, the monitoring service provides the API to the client device such that the client can integrate the API into the browser (STEP 911 0). The facilitator then initiates a request to a content provider from the user's browser to initiate an operation (STEP 915). Assuming the domain of the monitoring service is "better-advertising.com," an exemplary HTTP command for such a request may take the form of:

GET/oba-api/v1/user_service?action=init&key=A34bY34 jKO&domain=betteradvertising.com
Host: ad.net The content provider receives the init request (STEP 920), which appears to have been initiated by the monitoring service 205 but another entity could be spoofing the monitoring service. Therefore, the content provider issues a separate sync-keys request (STEP 925) directly against the domain of the monitoring service, passing the key from the monitoring service and its own key generated for the operation, while keeping the init request on hold. An example HTTP request may take the form of:

GET/oba-api/v1/user_service?action=sync=
keys& domain=ad.net&key=A34bY34jKO&my_key=
0.67813503
Host: betteradvertising.com The facilitator then receives the sync-keys request and checks the key parameter to make sure it initiated an operation with this key (STEP 930). If that check passes, the facilitator stores the content provider key with its own key and returns success (STEP 935). Having successfully paired keys, the content provider stores the key pair and responds back to facilitator (STEP 940). In the response, it passes the facilitator's own key back to enable state management. Exemplary HTTP requests may take the form of:

HTTP/1.1 302 Found
Location: http://betteradvertising.com/oba-api/v1/
user_service?action=init-
response& domain=ad.net&key=A34b Y34jKO
GET/oba-api/v1/user_service?action=init-
response&domain=ad.net&key=A34bY34jKO
Host: betteradvertising.com The facilitator then responds with a request for a set operation (STEP 945) by passing the key it received from content provider via the sync-keys operation such that the client device can submit the request to the content provider (STEP 950). Exemplary HTTP requests may take the form of:

HTTP/1.1 302 Found
Location:
http://ad.net/v1/
user_service?action=set&key=0.67813503&
domain=betteradvertising.co
m&name=oba&va
lue=opt-out
GET/oba-
api/v1/user_service?action=set&key=0.67813503&
domain=betteradvertising.
com&name
=oba&value=opt-
out
HOST: ad.net The content provider then verifies that it recently received that key for that user (STEP 955). If so, it processes request and responds with set-response, passing facilitator's key. Exemplary HTTP requests may take the form of:

HTTP/1.1 302 Found
Location:
http://betteradvertising.com/oba-api/v1/
user_service?action=set-
reponse& key=A34bY34jKO&domain=ad.net
GET/oba-api/v1/user_service?action=set-
reponse&key=A34b Y34jKO&domain=ad.net
HOST: betteradvertising.com The facilitator then generates a response to the user's browser and returns the response confirming completion of the process (STEP 960).

A request by the monitoring service to retrieve (as opposed to setting) a user's opt-out status follows a similar process, except that the request in STEP 945 is for a get operation with the name=oba parameter and in STEP 955 the get-response includes a name=oba and value=opt-out parameters.

If the facilitator receives an unexpected sync-keys operation in STEP 930 it can issue a 500 status response and set the OBA-API-Error-Code response header to InvalidKey. In order to allow the facilitator to generate an appropriate error message for the user, the content provider responds to the facilitator with a redirect to an invalid key URL, such as:

http://betteradvertising.com/oba-
api/v1/user_service?action=error&key=A34bY34j
KO&domain=ad.net&error_code=Inva
lidKey&error_info=Some %20info.

If there is an error on the server during the processing of the set operation in STEP 955, the content provider responds with a redirect to a URL unavailable URL such as:

http://betteradvertising.com/oba
api/v1/user_service?action=error&key=A34bY34j
KO&domain=ad.net&error_code=Inter
nalError&error_info=Server %20unavailable.

In another embodiment, referring URLs may also be checked to validate requests. As many existing opt out pages are vulnerable to Cross-Site Request Forgery (CSRF) attacks. In short, a malicious page could trick a user into opting out from a vulnerable Service Provider by inserting the Provider's opt out URL in a hidden tag.

While the above example shows how this service can be used to set and retrieve a user's opt-out preference with regards to a specific network, it can easily be extended to apply to other preferences such as user behaviors and interests that are tracked and used by contributors.

The invention may also be provided as an article of manufacture having a computer-readable medium with computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, JavaScript, Flashscript, C#, Tcl, BASIC and assembly language. Further, the computer-readable instructions may, for example, be written in a script, macro, or functionally embedded in commercially available software (such as, e.g., EXCEL or VISUAL BASIC).

Although the present invention has been described with reference to specific details, it is not intended that such details should be regarded as limitations upon the scope of the invention.

The invention claimed is:

1. A computer system to implement a monitoring service to provide a set of notices, to a viewer of electronic ad content on a client computing device, regarding targeted advertising techniques used by an advertising entity to deliver the electronic ad content to the viewer via the Internet on one or more web pages displayed on the client computing device by a web browser of the client computing device, the system comprising:
at least one processor to implement a configuration subsystem to facilitate customization of the set of notices by the advertising entity providing the electronic ad content, the configuration subsystem generating visual templates for designing the set of notices to include at least one of text, at least one graphic, and at least one link to additional information relating to the electronic ad content, wherein the set of notices comprises:
a primary notice including at least one of a primary notice icon and primary notice text arranged proximate to or over the electronic ad content; and
a secondary notice appearing upon selection by the viewer of the primary notice and comprising at least some of the at least one of the text, the at least one graphic, and the at least one link to the additional information relating to the electronic ad content;

at least one memory including a script library to store at least one script that, when deployed to and executed by the web browser of the client computing device, presents on the client computing device at least some of the set of notices to the viewer as customized by the advertising entity via the configuration subsystem, wherein the monitoring service generates a notice tag comprising a parameterized HTTP request having at least one ID parameter to uniquely identify the at least one script in the script library; and a communication interface to:
transmit to the advertising entity, via the Internet, the notice tag to embed in code for the electronic ad content provided by the advertising entity to the client computing device;
receive, via the Internet and from the web browser of the client computing device, a request for the at least one script based on the at least one ID parameter in the notice tag upon execution of the notice tag by the web browser of the client computing device; and
transmit, via the Internet to the client computing device, and in response to the request received from the web browser, the at least one script from the script library.

2. The system of claim 1, wherein the at least one ID parameter to uniquely identify the at least one script includes a CAMPAIGN ID keyed off of the electronic ad content, and wherein the notice tag comprises the parameterized HTTP request having the CAMPAIGN ID.

3. The system of claim 1, wherein:
the electronic ad content is provided by a first advertising entity to a second advertising entity, and from a second advertising entity to the client computing device;
the electronic ad content provided to the client computing device includes:
a first notice tag generated by the monitoring service, transmitted by the communication interface to the first advertising entity and associated with a first script in the script library to cause presentation of a first set of notices to the viewer; and
a second notice tag generated by the monitoring service, transmitted by the communication interface to the second advertising entity and associated with a second script in the script library to cause presentation of a second set of notices to the viewer; and
only one of the first set of notices and the second set of notices is presented on the client computing device to avoid notice collision.

4. The system of claim 3, wherein the parameterized HTTP request for each of the first notice tag and the second notice tag includes a DO_NOTICE parameter comprising a binary value representing whether the monitoring service is to serve the first script or the second script to the client computing device if the monitoring service determines that one of the first set of notices and the second set of notices is non-extant or insufficient.

5. The system of claim 1, wherein the visual templates generated by the configuration subsystem include at least one cascading style sheet (CSS) and/or at least one HTML template.

6. The system of claim 1, wherein via the configuration subsystem, the advertising entity specifies placement properties of the primary notice icon, and wherein the placement properties are implemented by the at least one script.

7. The system of claim 1, wherein:
via the configuration subsystem, the advertising entity specifies at least one of a message displayed in the secondary notice, a first name of the advertising entity, a logo for the advertising entity, and a Uniform Resource Locator (URL) for the advertising entity; and
the at least one script, when deployed to and executed by the web browser of the client computing device, presents to the viewer the secondary notice including the at least one of the message, the name of the advertising entity, the logo for the advertising entity, and the URL for the advertising entity.

8. The system of claim 7, wherein the message displayed in the secondary notice includes at least one of:
a second name of a delivering ad network;
a third name of at least one intermediate ad network; and
behavioral targeted advertising practices of the advertising entity.

9. The system of claim 7, wherein the secondary notice includes data providers or enhancers of the electronic ad content provided by the advertising entity.

10. The system of claim 7, wherein via the configuration subsystem, the advertising entity specifies the at least one link in the secondary notice that, when selected by the viewer, provides the additional information relating to the electronic ad content.

11. The system of claim 10, wherein:
the message displayed in the secondary notice is an industry-defined message; and
the additional information specified by the at least one link includes at least one industry association-developed website.

12. The system of claim 10, wherein the additional information specified by the at least one link includes at least one of privacy policies and advertising practice information relating to the advertising entity.

13. The system of claim 10, wherein the additional information specified by the at least one link includes sources of targeted advertisements and personal preferences of the viewer regarding tracking mechanisms used by the sources.

14. The system of claim 13, wherein the additional information includes:
a list of the sources; and
for each source in the list, respective indicators for whether or not the source uses at least one cookie, whether or not the at least one cookie is active, and/or if the viewer has opted out of or disabled the at least one cookie.

15. The system of claim 10, wherein the additional information specified by the at least one link includes sources of targeted advertisements and an opt-in or opt-out choice of the viewer regarding each source.

16. The system of claim 1, further comprising a plurality of discovery engines to identify at least one element of electronic content on the one or more web pages displayed on the client computing device aimed at delivering at least one targeted advertising message to the viewer.

17. The system of claim 1, further comprising a data storage module storing at least one of:
one or more indications of interactions of the viewer with the set of notices;
advertising practices of the advertising entity; and
advertising preferences of the viewer.

18. The system of claim 17, wherein the one or more indications of the interactions of the viewer with the set of notices comprise one or more of:

the viewer selecting the primary notice;
the viewer viewing the secondary notice;
the viewer selecting the secondary notice;
the viewer changing the advertising preferences; and
the viewer viewing the advertising practices of the advertising entity.

19. The system of claim 17, wherein the advertising preferences of the viewer comprise one or more of:
opting out of receiving the electronic ad content from the advertising entity;
agreeing to receive the electronic ad content from the advertising entity; and
specification of personal demographic information of the viewer.

20. The system of claim 17, further comprising a reporting engine for providing electronic access to data stored in the data storage module.

21. The system of claim 20, wherein the reporting engine implements a web-based portal to provide electronic access to the data stored in the data storage module.

22. A computer system to implement a monitoring service to provide a set of notices, to a viewer of electronic ad content on a client computing device, regarding targeted advertising techniques used by an advertising entity to deliver the electronic ad content to the viewer via the Internet on one or more web pages displayed on the client computing device by a web browser of the client computing device, the system comprising:
at least one processor to implement a configuration subsystem to facilitate customization of the set of notices by the advertising entity providing the electronic ad content, the configuration subsystem generating visual templates for designing the set of notices to include at least one of text, at least one graphic, and at least one link to additional information relating to the electronic ad content, wherein the set of notices comprises:
a primary notice including at least one of a primary notice icon and primary notice text arranged proximate to or over the electronic ad content; and
a secondary notice appearing upon selection by the viewer of the primary notice and comprising at least some of the at least one of the text, the at least one graphic, and the at least one link to the additional information relating to the electronic ad content;
a memory including a script library to store at least one script that, when deployed to and executed by the web browser of the client computing device, presents on the client computing device at least some of the set of notices to the viewer as customized by the advertising entity via the configuration subsystem, wherein the monitoring service generates a notice tag comprising a parameterized HTTP request having at least one ID parameter to uniquely identify the at least one script in the script library;
the memory further including a data storage module storing at least one of:
one or more indications of interactions of the viewer with the set of notices;
advertising practices of the advertising entity; and
advertising preferences of the viewer,
wherein the one or more indications of the interactions of the viewer with the set of notices comprise one or more of:
the viewer selecting the primary notice;
the viewer viewing the secondary notice;
the viewer selecting the secondary notice;
the viewer changing the advertising preferences; and
the viewer viewing the advertising practices of the advertising entity; and
a communication interface to:
transmit to the advertising entity, via the Internet, the notice tag to embed in code for the electronic ad content provided by the advertising entity to the client computing device;
receive, via the Internet and from the web browser of the client computing device, a request for the at least one script based on the at least one ID parameter in the notice tag upon execution of the notice tag by the web browser of the client computing device; and
transmit, via the Internet to the client computing device, and in response to the request received from the web browser, the at least one script from the script library, wherein:
via the configuration subsystem, the advertising entity specifies at least one of a message displayed in the secondary notice, a first name of the advertising entity, a logo for the advertising entity, and a Uniform Resource Locator (URL) for the advertising entity; and
the at least one script, when deployed to and executed by the web browser of the client computing device, presents to the viewer the secondary notice including the at least one of the message, the name of the advertising entity, the logo for the advertising entity, and the URL for the advertising entity.

23. A method of providing a set of notices, to a viewer of electronic ad content on a client computing device, regarding targeted advertising techniques used by an advertising entity to deliver the electronic ad content to the viewer via the Internet on one or more web pages displayed on the client computing device by a web browser of the client computing device, the method comprising:
A) providing a user interface to facilitate customization of the set of notices to include at least one of text, at least one graphic, and at least one link to additional information relating to the electronic ad content, wherein the set of notices comprises:
a primary notice including at least one of a primary notice icon and primary notice text arranged proximate to or over the electronic ad content; and
a secondary notice appearing upon selection by the viewer of the primary notice and comprising at least some of the at least one of the text, the at least one graphic, and the at least one link to the additional information relating to the electronic ad content;
B) storing at least one script that, when deployed to and executed by the web browser of the client computing device, presents on the client computing device to the viewer at least some of the set of notices as customized in A);
B1) generating a notice tag comprising a parameterized HTTP request having at least one ID parameter to uniquely identify the at least one script in B);
C) receiving a request from the client computing device for the at least one script; and
D) transmitting the at least one script to the client computing device, in response to the request in C), so as to cause presentation of the at least some of the set of notices to the viewer of the electronic ad content,
wherein the method further comprises:
after B1 and prior to C), providing the notice tag to the advertising entity, to embed in code for the electronic ad content provided by the advertising entity to the client computing device, wherein the request in C) is generated upon execution of the notice tag by the web browser of the client computing device as part of the code for the electronic ad content, based on the at least one ID parameter in the notice tag.

24. The method of claim 23, wherein the at least one ID parameter to uniquely identify the at least one script includes a CAMPAIGN ID keyed off of the electronic ad content, and wherein the notice tag comprises the parameterized HTTP request having the CAMPAIGN ID.

25. The method of claim 23, wherein:
the electronic ad content is provided by a first advertising entity to a second advertising entity, and from a second advertising entity to the client computing device;
the electronic ad content provided to the client computing device includes:
a first notice tag associated with the first advertising entity and a first script to cause presentation of a first set of notices to the viewer; and
a second notice tag associated with the second advertising entity and a second script in the script library to cause presentation of a second set of notices to the viewer; and
D) comprises transmitting only one of the first script and the second script to the client computing device so as to present only one of the first set of notices and the second set of notices on the client computing device to avoid notice collision.

26. The method of claim 25, wherein the parameterized HTTP request for each of the first notice tag and the second notice tag includes a DO_NOTICE parameter comprising a binary value representing whether the first script or the second script is transmitted in D) to the client computing device if one of the first set of notices and the second set of notices is non-extant or insufficient.

27. The method of claim 23, wherein in A) the user interface allows specification of placement properties of the primary notice icon proximate to or over the electronic ad content.

28. The method of claim 23, wherein:
in A) the user interface allows specification of at least one of a message displayed in the secondary notice, a first name of the advertising entity, a logo for the advertising entity, and a Uniform Resource Locator (URL) for the advertising entity; and
in D), the at least one script, when deployed to and executed by the web browser of the client computing device, presents to the viewer the secondary notice including the at least one of the message, the name of the advertising entity, the logo for the advertising entity, and the URL for the advertising entity.

29. The method of claim 28, wherein the message displayed in the secondary notice includes at least one of:
a second name of a delivering ad network;
a third name of at least one intermediate ad network; and
behavioral targeted advertising practices of the advertising entity.

30. The method of claim 28, wherein the secondary notice includes data providers or enhancers of the electronic ad content provided by the advertising entity.

31. The method of claim 28, wherein in A) the user interface allows specification of the at least one link in the secondary notice that, when selected by the viewer, provides the additional information relating to the electronic ad content.

32. The method of claim 31, wherein:
the message displayed in the secondary notice is an industry-defined message; and
the additional information specified by the at least one link includes at least one industry association-developed website.

33. The method of claim 31, wherein the additional information specified by the at least one link includes at least one of privacy policies and advertising practice information relating to the advertising entity.

34. The method of claim 31, wherein the additional information specified by the at least one link includes sources of targeted advertisements and personal preferences of the viewer regarding tracking mechanisms used by the sources.

35. The method of claim 34, wherein the additional information includes:
a list of the sources; and
for each source in the list, respective indicators for whether or not the source uses at least one cookie, whether or not the at least one cookie is active, and/or if the viewer has opted out of or disabled the at least one cookie.

36. The method of claim 31, further comprising providing the additional information relating to the electronic ad content in response to the user selecting the at least one link in the secondary notice, wherein the additional information includes sources of targeted advertisements and an opt-in or opt-out choice of the viewer regarding each source.

37. The method of claim 23, further comprising storing at least one of:
one or more indications of interactions of the viewer with the set of notices;
advertising practices of the advertising entity; and
advertising preferences of the viewer.

38. The method of claim 37, wherein the one or more indications of the interactions of the viewer with the set of notices comprise one or more of:
the viewer selecting the primary notice;
the viewer viewing the secondary notice;
the viewer selecting the secondary notice;
the viewer changing the advertising preferences; and
the viewer viewing the advertising practices of the advertising entity.

39. The method of claim 37, wherein the advertising preferences of the viewer comprise one or more of:
opting out of receiving the electronic ad content from the advertising entity;
agreeing to receive the electronic ad content from the advertising entity; and
specification of personal demographic information of the viewer.

* * * * *